United States Patent
Takagi et al.

(10) Patent No.: US 6,809,760 B1
(45) Date of Patent: Oct. 26, 2004

(54) CAMERA CONTROL APPARATUS FOR CONTROLLING A PLURALITY OF CAMERAS FOR TRACKING AN OBJECT

(75) Inventors: Tsuneyoshi Takagi, Kawasaki (JP); Takashi Oya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/327,748

(22) Filed: Jun. 7, 1999

(30) Foreign Application Priority Data

Jun. 12, 1998 (JP) ............................................ 10-165174
May 14, 1999 (JP) ............................................ 11-133934

(51) Int. Cl.⁷ .............................................. H04N 5/232
(52) U.S. Cl. ................................ 348/211.9; 348/211.99; 348/143; 348/207.1
(58) Field of Search ......................... 348/211.99, 211.1, 348/211.6, 211.9, 211.11, 211.13, 169, 143, 154, 153, 552, 345, 348, 352, 207.1, 207.11; 382/103

(56) References Cited

U.S. PATENT DOCUMENTS 5,164,827 A * 11/1992 Paff ............................ 348/143
6,100,925 A * 8/2000 Rosser et al. ............... 348/169
6,359,647 B1 * 3/2002 Sengupta et al. ........... 348/143
6,404,455 B1 * 6/2002 Ito et al. ...................... 348/169
2002/0054210 A1 * 5/2002 Glier et al. .................. 348/149

* cited by examiner

Primary Examiner—Aung Moe
(74) Attorney, Agent, or Firm—Cowan, Liebowitz & Latman

(57) ABSTRACT

A tracking camera system which permits tracking an object with a plurality of cameras by changing the use of them from one camera over to another and is arranged to be capable of adequately capturing the object of tracking, without missing the object, even after one camera is changed over to another. The tracking object is decided within a display image plane. The attitude of camera in use for tracking is controlled in such a way as to have the tracking object always placed at the center of the display image plane. The tracking camera in use is changed over to another camera when the tracking object on display comes outside of the center part of the image plane, so that the object can be continuously tracked.

33 Claims, 20 Drawing Sheets

FIG. 5

|  | SETTING COORDINATES | | SETTING DIRECTION |
|---|---|---|---|
| CAMERA 1 | $X_1$ | $Y_1$ | $\delta_1$ |
| CAMERA 2 | $X_2$ | $Y_2$ | $\delta_2$ |
| CAMERA 3 | $X_3$ | $Y_3$ | $\delta_3$ |
| ⋮ | ⋮ | ⋮ | ⋮ |

FIG. 9

| CAMERA ID | SETTING COORDINATES | | | SETTING DIRECTION | |
|---|---|---|---|---|---|
| CAMERA 1 | r1 | $\phi 1$ | $\theta 1$ | $Pan_0\ 1$ | $Tilt_0\ 1$ |
| CAMERA 2 | r2 | $\phi 2$ | $\theta 2$ | $Pan_0\ 2$ | $Tilt_0\ 2$ |
| CAMERA 3 | r3 | $\phi 3$ | $\theta 3$ | $Pan_0\ 3$ | $Tilt_0\ 3$ |
| ⋮ | ⋮ | ⋮ | ⋮ | ⋮ | ⋮ |

FIG. 10

| CAMERA ID | CURRENT DIRECTION | | CURRENT ZOOM POSITION |
|---|---|---|---|
| CAMERA 1 | pan 1 | tilt 1 | zoom 1 |
| CAMERA 2 | pan 2 | tilt 2 | zoom 2 |
| CAMERA 3 | pan 3 | tilt 3 | zoom 3 |
| ⋮ | ⋮ | ⋮ | ⋮ |

FIG. 18

| HEADER |
|---|
| COMMAND (EVALUATION) |
| OBJECT COORDINATES r |
| OBJECT COORDINATES $\theta_{obj}$ |
| OBJECT COORDINATES $\phi_{obj}$ |
| OBJECT MOVING DIRECTION $\theta_v$ |
| OBJECT MOVING DIRECTION $\phi_v$ |

CAMERA CONTROL APPARATUS FOR CONTROLLING A PLURALITY OF CAMERAS FOR TRACKING AN OBJECT

BACKGROUND OF THE INVENTION

1. Field of the Invention

The present invention relates to a camera control apparatus, a camera control method, a camera and a computer-readable storage medium to be used for a tracking camera system arranged to track a tracking object with a plurality of cameras by changing use of the tracking camera from one camera over to another as necessary.

2. Description of Related Art

It has been known to arrange a tracking camera system to designate an object within a video image on display as a tracking object and to track the designated object by controlling the image picking-up direction of a camera according to the movement of the object.

Meanwhile, a system has recently been developed to connect a camera to a computer terminal by means of an RS serial cable or the like and to permit panning, tilting and zooming operations on the camera from the computer terminal. In such a system, some camera operating software is provided at the computer terminal for sending control commands to the camera by using a keyboard or a mouse, so that the camera can be operated from the computer terminal.

However, the prior art arrangement has presented a problem in that the attempt to track an object has to be given up at a point where the tracking object happens to come out of a shootable (trackable) range of the camera.

BRIEF SUMMARY OF THE INVENTION

It is, therefore, an object of the invention to provide a tracking camera system which permits tracking an object with a plurality of cameras by changing the use of them from one camera over to another and is arranged to be capable of adequately capturing the tracking object without missing the tracking object even after one camera in use for tracking is changed over to another camera.

To attain the above object, in accordance with an aspect of the invention, there is provided a camera control apparatus for controlling a plurality of cameras having tracking means for tracking an object, the camera control apparatus comprising obtaining means for obtaining, from the camera which is tracking the object, (a) information on a position of the object within a picked-up image and (b) information on an object distance, and control means for performing such control as to change over a camera which tracks the object among the plurality of cameras on the basis of (a) the information on the position of the object within the picked-up image and (b) the information on the object distance obtained by the obtaining means.

In accordance with another aspect of the invention, there is provided a camera control method for controlling a plurality of cameras having tracking means for tracking an object, the camera control method comprising an obtaining step of obtaining, from the camera which is tracking the object, (a) information on a position of the object within a picked-up image and (b) information on an object distance, and a control step of performing such control as to change over a camera which tracks the object among the plurality of cameras on the basis of (a) the information on the position of the object within the picked-up image and (b) the information on the object distance obtained by the obtaining step.

In accordance with a further aspect of the invention, there is provided a storage medium which stores therein a program for executing a process for controlling a plurality of cameras having tracking means for tracking an object, the process comprising obtaining, from the camera which is tracking the object, (a) information on a position of the object within a picked-up image and (b) information on an object distance, and performing such control as to change over a camera which tracks the object among the plurality of cameras on the basis of (a) the information on the position of the object within the picked-up image and (b) the information on the object distance.

The above and other objects and features of the invention will become apparent from the following detailed description of preferred embodiments thereof taken in connection with the accompanying drawings.

BRIEF DESCRIPTION OF THE SEVERAL VIEWS OF THE DRAWING

FIG. 5 is a diagram showing the arrangement of data included in a table of information on the initial attitudes of cameras.

FIG. 9 is a diagram showing the arrangement of data included in a table of information on the setting states of cameras.

FIG. 10 is a diagram showing the arrangement of data included in a table of information on the geometric states of cameras.

FIG. 18 is a diagram for explaining the format of an evaluation-value requesting message to be issued by the computer to the camera.

DETAILED DESCRIPTION OF THE INVENTION

Hereinafter, preferred embodiments of the invention will be described in detail with reference to the drawings.

Figure 1:
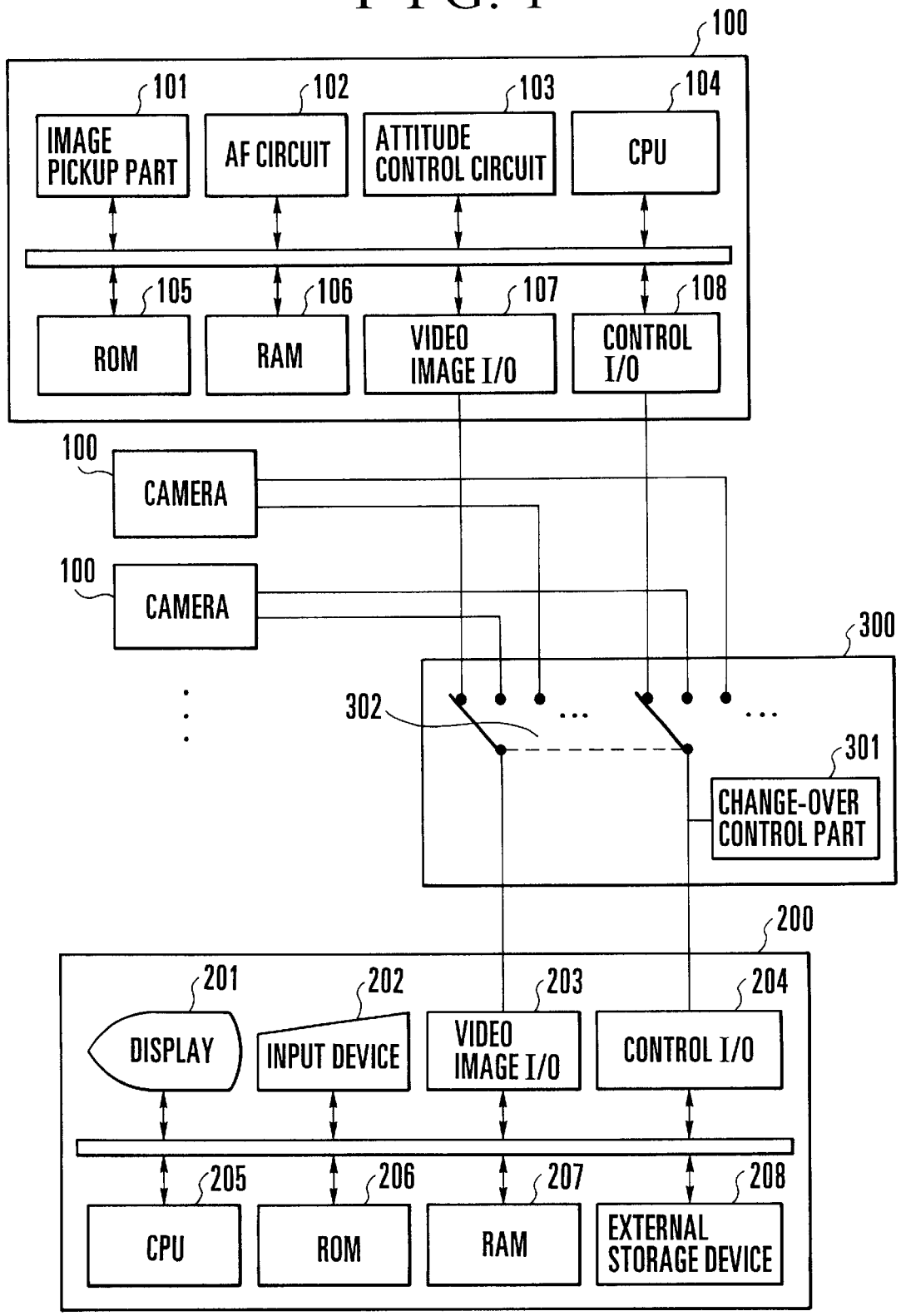
FIG. 1 is a block diagram showing the arrangement of a tracking camera system according to a first embodiment of the invention.

FIG. 1 shows in a block diagram the arrangement of a tracking camera system according to a first embodiment of the invention.

Referring to FIG. 1, the tracking camera system includes a plurality of cameras 100 each of which is composed of parts 101 to 108, and a computer terminal 200 which is mainly composed of parts 201 to 208. The tracking camera system further includes a camera change-over device 300.

In the camera 100, the image pickup part 101 is composed of a lens unit including a lens arranged to make focus adjustment, i.e., a focusing lens, etc., a diaphragm arranged to adjust quantity of light, and a CCD arranged to convert, into an electrical signal, an optical image incident thereon through the lens unit and the diaphragm.

The AF circuit 102 is arranged to extract a high frequency component of an image signal obtained from the CCD and to drive the focusing lens to move to a position where the highest degree of image sharpness is obtained. In the case of the first embodiment, a parameter used for AF (automatic focusing) control is a pulse value of a stepping motor which is used for driving the focusing lens. The camera 100 is thus arranged to be capable of obtaining a focusing distance to an object of shooting by detecting a number of pulses which corresponds to a lens moving extent from a reference in-focus distance which is, for example, 1 m.

The attitude control circuit 103 is arranged to control the attitude (posture) of the camera 100, including the panning, tilting and zooming states of the camera 100, on the basis of the values of attitude control parameters inputted from the control I/O 108. The attitude control parameters in the case of the first embodiment include a pulse value of a motor which drives the camera 100 in the direction of panning as a parameter for panning control, a pulse value of a motor which drives the camera 100 in the direction of tilting as a parameter for tilting control, and a pulse value of a motor which drives a zoom lens as a parameter for zooming control. The state of attitude of the camera 100 is grasped, like in the case of the AF control, by detecting a number of pulses of each of these motors corresponding to a lens moving extent from a reference position. The CPU 104 performs overall control of the whole camera 100. The CPU 104 controls the image pickup part 101, the AF circuit 102 and the attitude control circuit 103 to cause them to adequately carry out their actions by sending commands to them or in response to control commands which are coming from the computer terminal 200.

The ROM 105 stores therein programs of varied kinds to be executed by the CPU 104. The RAM 106 is arranged to provide a program of processes to be executed within the camera 100 and the work area of the program or to provide a temporary standby area of video data inputted from the image pickup part 101 or data related to a command coming from the computer terminal 200.

The video image I/O 107 is connected to the video image I/O 203 of the computer terminal 200 and is thus arranged to send, to the computer terminal 200, image data which is obtained through a predetermined processes such as a compression process, etc. The control I/O 108 is connected, by a cable such as RS232C, to the control I/O 204 of the computer terminal 200 and is thus arranged to exchange control commands or information on parameters about the camera 100 with the computer terminal 200.

In the computer terminal 200, the display 201 which is composed of a CRT or an LCD is arranged to display images picked up by the camera 100 on the basis of image data received. The input device 202 for inputting control commands is composed of a keyboard or a mouse which functions as a pointing device.

The video image I/O 203 is arranged to receive video image data from the camera 100. The control I/O 204 is arranged to send and receive control commands to and from the camera 100.

The CPU 205 controls the whole of the computer terminal 200 and is arranged to read a program stored in the ROM 206 and to execute various control processes on the basis of the program read out. The ROM 206 stores therein various programs provided for execution of processes by the CPU 205. The RAM 207 is arranged to provide the work areas of the various programs or a temporary standby area of data inputted from the input device 202.

The external storage device 208, which is an FDD (floppy disk), a hard disk or a CD-ROM, stores therein a program for processes to be executed by the computer terminal 200. The processes can be carried out by reading out the program from the external storage device 208. In the first embodiment, a table of information on the initial attitudes of the cameras 100 as shown in FIG. 5 is stored in the external storage device 208. At the start-up of the system, the state of attitude of each camera is grasped by reading values in the table and writing them into the RAM 207. The state relative to the attitudes of the cameras 100 are managed by rewriting these values.

In the camera change-over device 300, a change-over control part 301 is arranged to change the use of one camera over to use of another in accordance with the commands of the computer terminal 200. A switch 302 is arranged to switch the connection of the video image I/O 107 of each camera 100 to the video image I/O 203 of the computer terminal 200 and the connection of the control I/O of each camera 100 to the control I/O 204 of the computer terminal 200 respectively from one camera over to another.

Figure 2:
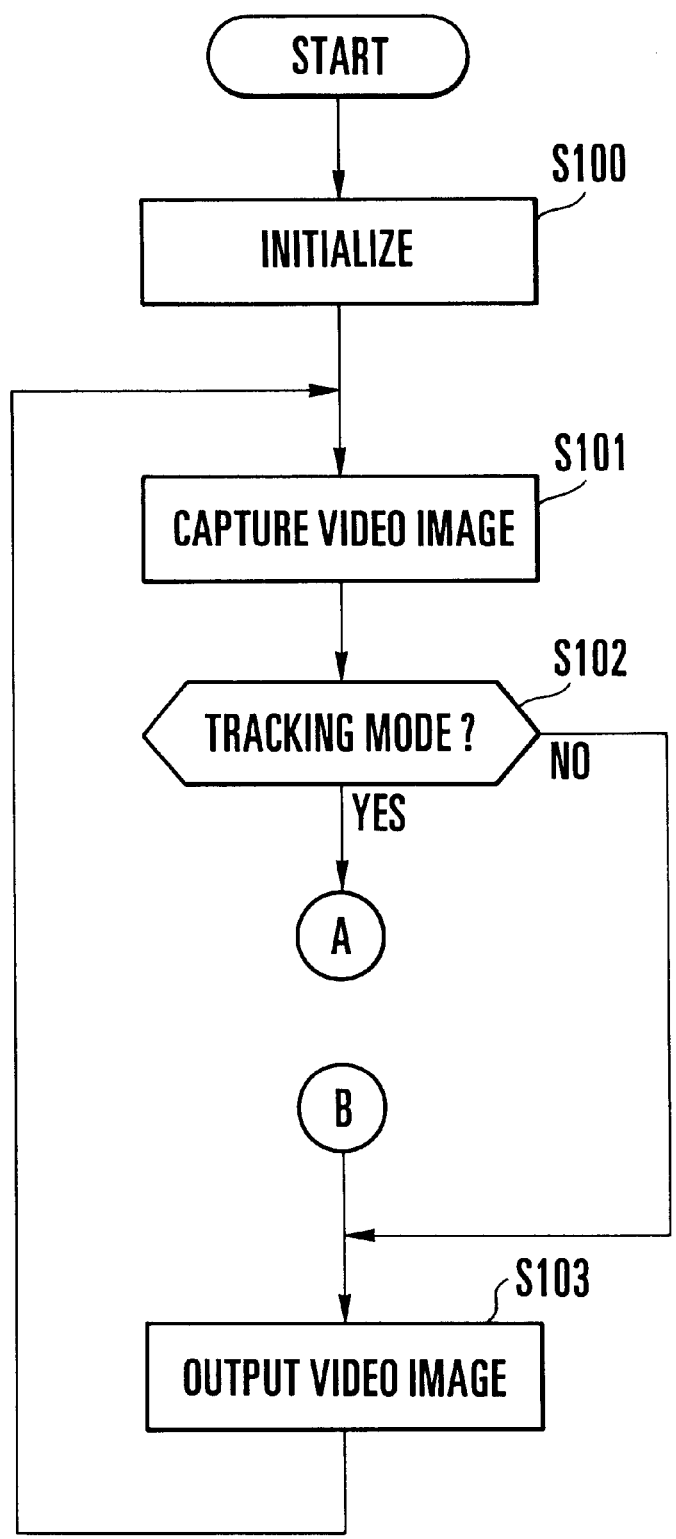
FIG. 2 is a flow chart showing the operation of a main loop of the system according to the first embodiment of the invention.

The actions and processes of the tracking camera system according to the first embodiment are next described. FIG. 2 is a flow chart showing the operation of the main loop to be executed after a start-up of the system.

At a step S100 of FIG. 2, the whole system is initialized in the first place. The initializing step mainly includes program reading and writing into the RAMs 106 and 207 and allotment of the work area to each of the processes to be executed. At a step S101, image data inputted from the image pickup part 101 is stored in an input image standby area of the RAM 106.

At the next step S102, a check is made to find if the system is in a mode of tracking a designated object (hereinafter referred to as the tracking mode). In the case of the first embodiment, the check for the mode is made by making reference to values written into an area of the RAM 207 provided for variables indicating the state of the tracking mode. If the system is found to be in the tracking mode, the programmed control of the system shifts to a tracking process A. If not, the flow proceeds from the step S102 to a step S103. At the step S103, the image data stored in the RAM 106 is sent from the video image I/O 107. On the side of the computer terminal 200, the image data received is stored in the RAM 207 through the video image I/O 203. The content of the image data is then sent to the display 201. The steps S101, S102 and S103 are repeated until the operation of the system comes to an end.

Further, in a case where the control shifts to the process A, the flow returns to a process B after completion of a tracking process described later herein.

Figure 3:
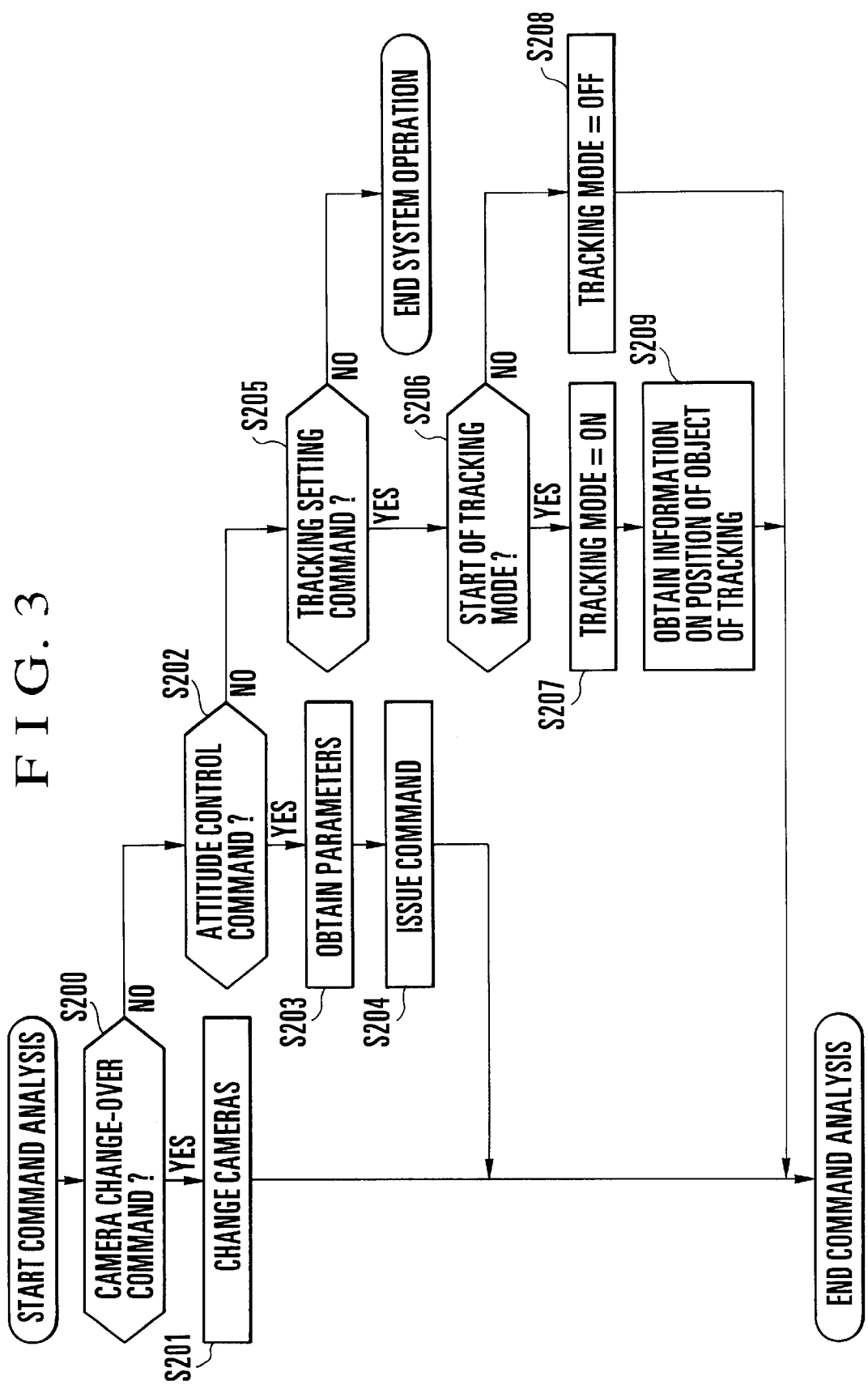
FIG. 3 is a flow chart showing the operation of the system of the first embodiment in executing input commands.

An operation to be executed on the system on the side of the computer terminal 200 is next described. FIG. 3 is a flow chart showing a flow of operation to be performed by the computer terminal 200 to execute commands inputted through the input device 202.

Referring to FIG. 3, at a step S200, a command inputted is analyzed to find if it is a command for change-over from one camera to another. If so, the flow proceeds to a step S201. At the step S201, a process is executed to change the camera in use over to another. A change-over command is sent to the camera change-over device 300. Upon receipt of the command, the change-over control part 301 controls the switch 302 to switch the connection of the computer terminal 200 over to the camera 100 designated.

If the command is found at the step S200 to be not the camera change-over command, the flow of operation proceeds from the step S200 to a step S202. At the step S202, a check is made to find if the input command is an attitude control command. If so, the flow proceeds to a step S203. At the step S203, the values of parameters for panning, tilting and zooming are obtained from the attitude control command. However, the command might be only for a change of panning or tilting or might be for both panning and tilting. At the step S203, therefore, only such a parameter or parameters that are required by the command is obtained. At a step S204, an attitude control command is prepared by adding the values of the parameters obtained to the command. The attitude control command is then sent from the computer terminal 200 to the camera 100 through the control I/O 204 and the control I/O 108. Upon receipt of the attitude control command, the camera 100 writes the contents of the attitude control command into the RAM 106. Then, the CPU 105 causes the attitude control circuit 103 to carry out the command by making reference to the contents of the RAM 106.

If the input command is found at the step S202 to be not the attitude control command, the flow proceeds from the step S202 to a step S205. At the step S205, a check is made to find if the input command is a command to set the tracking mode. In the case of the first embodiment, the tracking mode is set as follows. The position of a cursor (such as a mouse cursor) of the pointing device is shifted to an object of tracking included in a video image displayed on the display 201. In the case of a mouse, the mouse is clicked at the image of the object and the process of the tracking mode begins. Then, the object of tracking is detected on the basis of information on the color of pixels located around the position of the cursor when the mouse is clicked. There are some other known tracking methods. The tracking method usable for this system is not limited to a specific method such as the one described above. This system can be arranged to use any tracking method as desired. In canceling the tracking mode with the system set in the tracking mode, the mouse cursor is moved to an arbitrary part of the video image on the display 201 and the mouse is clicked there.

If the input command is found at the step S205 to be the tracking setting command, the flow proceeds to a step S206. At the step S206, a discrimination is made between the start of the tracking mode and the cancellation of the tracking mode. In the case of the first embodiment, an area for a variable indicative of the current mode is provided within the RAM 207 to indicate the current mode by the value of the variable of this area. For example, the system is judged to be in the normal mode when the variable is at "0" and to be in the tracking mode when the variable is at "1". If the command is judged at the step S206 to be for the start of the tracking mode, the flow proceeds to a step S207 to write "ON" or "1" into the area for a variable indicative of the state of the tracking mode. If the command is judged to be for the cancellation of the tracking mode, the flow proceeds from the step S206 to a step S208 to write "OFF" or "0" into that area.

After the execution of the step S207 with the tracking mode judged to be started, the flow proceeds from the step S207 to a step S209. At the step S209, the position where the mouse has been clicked is obtained and information on the color of pixels around that position is stored in the RAM 207 as information representing a feature of the tracking object.

Further, if the input command is found at the step S205 to be not the tracking setting command, the command is considered to be a system operation ending command. In that case, a process for terminating the operation of the system is executed.

As described above, the processes of the steps S200 to S209 are handled as interruption processes to be allowed while the main loop of flow shown in FIG. 2 is in process. After completion of the interruption handling routine, the flow of operation returns to a part of the program where the interruption is allowed.

An operation of the system to be carried out in the tracking mode is next described with reference to FIG. 4, which is a flow chart showing the operation of the system to be carried out in the tracking mode.

Figure 4:
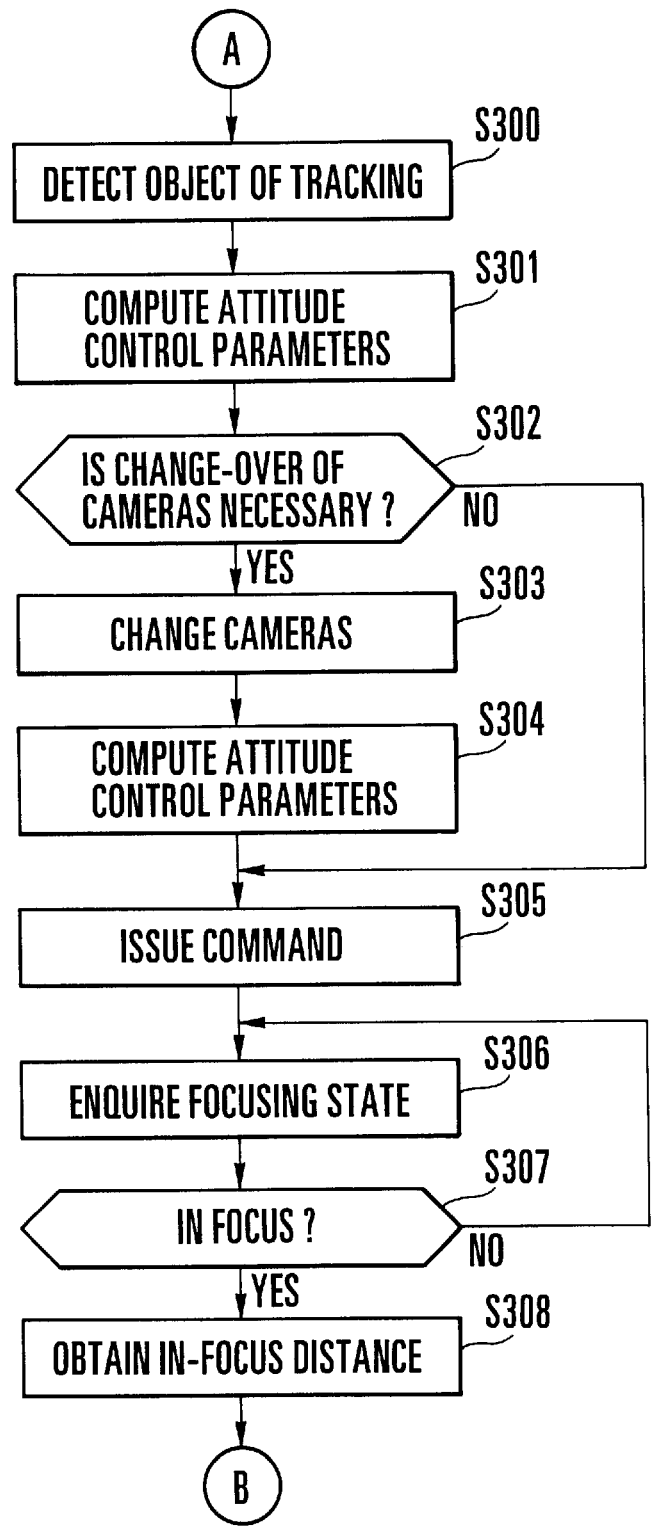
FIG. 4 is a flow chart showing the operation of the system in a tracking mode.

At a step S300 of FIG. 4, the position of the object of tracking is first detected on the basis of video data inputted from the image pickup part 101 and information on the feature of the object of tracking obtained at the above-stated step S209. In the case of the first embodiment, the information on the color of pixels around a designated pixel, i.e., a pixel of the video image at which the mouse is clicked, is used as a feature of the tracking object, as mentioned above. The movement of the object (a position to which the object have moved) is, therefore, detected by detecting a part to which the designated pixel has moved.

At a step S301, the values of attitude control parameters required for varying the attitude of the camera 100 is computed in such a way as to have the moving position of the object of tracking in the middle of a video image. In other words, the first embodiment is arranged to have the tracking object always in the middle of a video image picked up by the camera. At a step S302, a check is made to find if it is necessary to change the camera currently in use over to another camera. The camera currently in use is changed over to another camera when its posture comes to exceed the maximum left or right position of panning or the maximum upper or lower position of tilting.

In other words, use of one camera is changed over to another when it becomes no longer possible to have the image of the tracking object at the center of the video image by panning or tilting the camera currently in use under the attitude control. With the use of one camera thus decided to be changed over to the use of another, one of other cameras is selected by making reference to the table of information on the initial attitudes of cameras as shown in FIG. 5 together with information on the current attitude and focus adjustment of the camera in use before the camera change-over (information on an object distance obtained from a table stored inside of the camera on the basis of the current position of the focusing lens within the camera). A camera capable of capturing the object of tracking at the center of a video image is thus selected.

If the camera change-over is found at the step S302 to be necessary, the flow of operation proceeds to a step S303. At the step S303, the CPU 205 selects one of the other cameras by making reference to information on the position of the tracking object obtained at the step S301 and also to the table of information on the initial attitudes of cameras stored in the RAM 207. The CPU 205 then issues a camera change-over command in which information on the selected camera (such as camera ID data) is written. The camera change-over commend is sent to the camera change-over device 300. Upon receipt of the camera change-over command, the change-over control part 301 of the camera change-over device 300 performs a switch operation on the basis of the camera change-over command received. In a case where the camera change-over is found at the step S302 to be unnecessary, the flow proceeds from the step S302 to a step S305.

Figure 6:
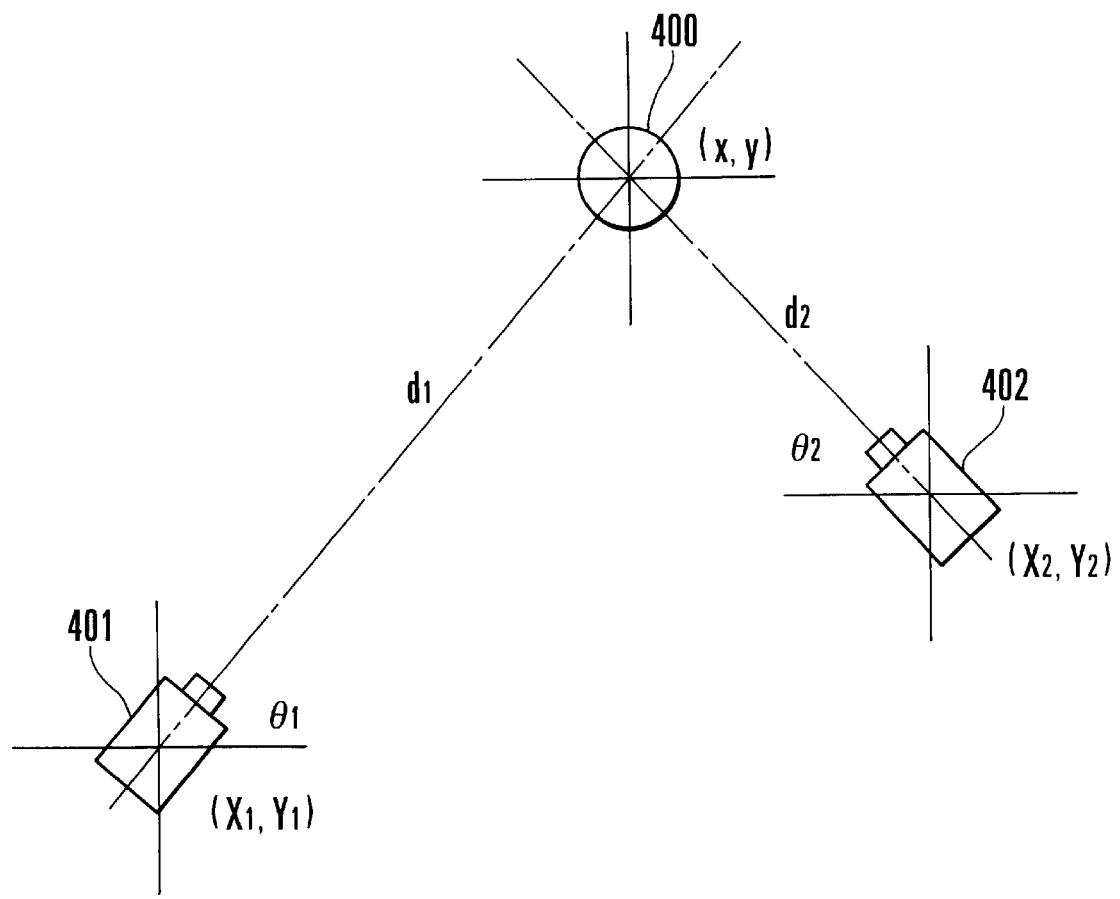
FIG. 6 is a diagram for explaining the method of changing over cameras.

At a step S304, the values of the attitude control parameters required for varying the posture (attitude) of the camera selected are computed. A method by which the values of the attitude control parameters are computed in the first embodiment is described referring to FIG. 6 as follows. To simplify the description, FIG. 6 shows the relation between the camera and the tracking object as viewed perpendicularly from above them. The attitude control in the direction of tilting is, therefore, not shown in FIG. 6. However, the tilting position of the camera is obtainable by carrying out a computing operation, in the same manner as the computation of the panning position, by viewing the camera from its one side. Therefore, the description given here covers only the attitude control in the panning direction.

In FIG. 6, reference numeral 400 denotes the tracking object. Reference numeral 401 denotes a camera in use before the camera change-over. Reference numeral 402 denotes a camera in use after the camera change-over.

The position (X1, Y1) of the camera 401 is known by making reference to the table of information on the initial attitudes of cameras shown in FIG. 5. The angle θ1 indicative of the attitude of the camera 401 in the direction of panning is detectable by enquiring of the camera 401 the number of pulses by which a driving motor for panning has moved in the panning direction. A distance d1 from the camera 401 to the tracking object 400 is detectable also by enquiring of the camera 401 the number of pulses by which the motor for driving the focusing lens has moved.

More specifically, the position (x, y) of the tracking object 400 is obtained by carrying out a computing operation in accordance with the following formula (1):

$$x = X_1 + d_1 \cos \theta_1$$
$$y = Y_1 + d_1 \sin \theta_1 \qquad (1)$$

Since the setting coordinates $X_2$ and $Y_2$ are known by making reference to the table of information on the initial attitudes of cameras, a distance d2 between the positions (x, y) and $(X_2, Y_2)$ can be obtained. Then, the values of the attitude control parameters for the camera 402 can be obtained by computing the value of an angle $\theta_2$ which satisfies the following formula (2):

$$d_2 \cos \theta_2 = |X_2 - x| \qquad (2)$$

Therefore, an actual panning angle of the camera 402 can be expressed as "$\delta_2 - \theta_2$". The value $\delta_2$ is a value obtained by making reference to the table of information on the initial attitudes of cameras. In other words, the panning angle can be expressed showing by how much degrees the camera has been panned from its initial angle position.

The ratio of the area occupied by the image of the tracking object to the whole video image can be kept relatively constant by controlling the zooming magnification of the camera 402 which is in use after the camera change-over. Assuming that the value of the zooming magnification of the camera 401 is $Z_1$, the value $Z_2$ of the zooming magnification of the other camera 402 can be obtained from the value of the ratio between the distance values $d_1$ and $d_2$ and the value of the zooming magnification $Z_1$.

At a step S305, a camera control command is prepared on the basis of the values of the attitude control parameters (panning, tilting and zooming magnification) obtained at the step S301 or S304. The camera control command thus prepared is sent to the camera 100. In this instance, the values of the attitude control parameters are stored in the RAM 207. The computation of the attitude control parameter values and the preparation and sending of the command are performed with a program written in the ROM 206 executed by the CPU 205.

With the camera control command received by the camera 100, the AF circuit 102 performs an automatic focusing (AF) action on a new position obtained after the posture of the camera is changed. Then, a flag which indicates whether or not the AF action has been completed and information on an in-focus distance obtained at that time are stored in the RAM 106.

Next, at a step S306, the computer terminal 200 makes an enquiry about the state of focusing. The enquiry process is made by checking an area of the RAM 106 where the flag indicating whether or not the AF action has been completed is stored. More specifically, a state referring command enquiring the state of the camera (the state of the focus indicating flag and the in-focus distance in this case) is sent to the camera 100 to obtain various values in reply to the command. This communication is conducted by the CPU 104 and the CPU 205 respectively through the control I/O 108 and the control I/O 204.

At a step S307, a check is made to find if the camera is in an in-focus state. If so, i.e., if the AF completion flag is found in its on-state, the flow proceeds from the step S307 to a step S308. At the step S308, information on an in-focus distance is obtained and is written into the RAM 207. If not, i.e., if the AF completion flag is found in its off-state, the flow returns from the step S307 to the step S306 to repeat the process of making the enquiry. If no in-focus state of the camera is found for a predetermined period of time by the repeated enquiry, the attempt to obtain an in-focus distance is given up by carrying out a time-out process. In that instance, an in-focus distance last obtained is retained as it is.

In the first embodiment, a system is formed by connecting the computer terminal 200 to the cameras 100 by means of cables. However, the system may be formed by connecting them through a network. A second embodiment of the invention is next described below with reference to FIG. 7.

Figure 7:
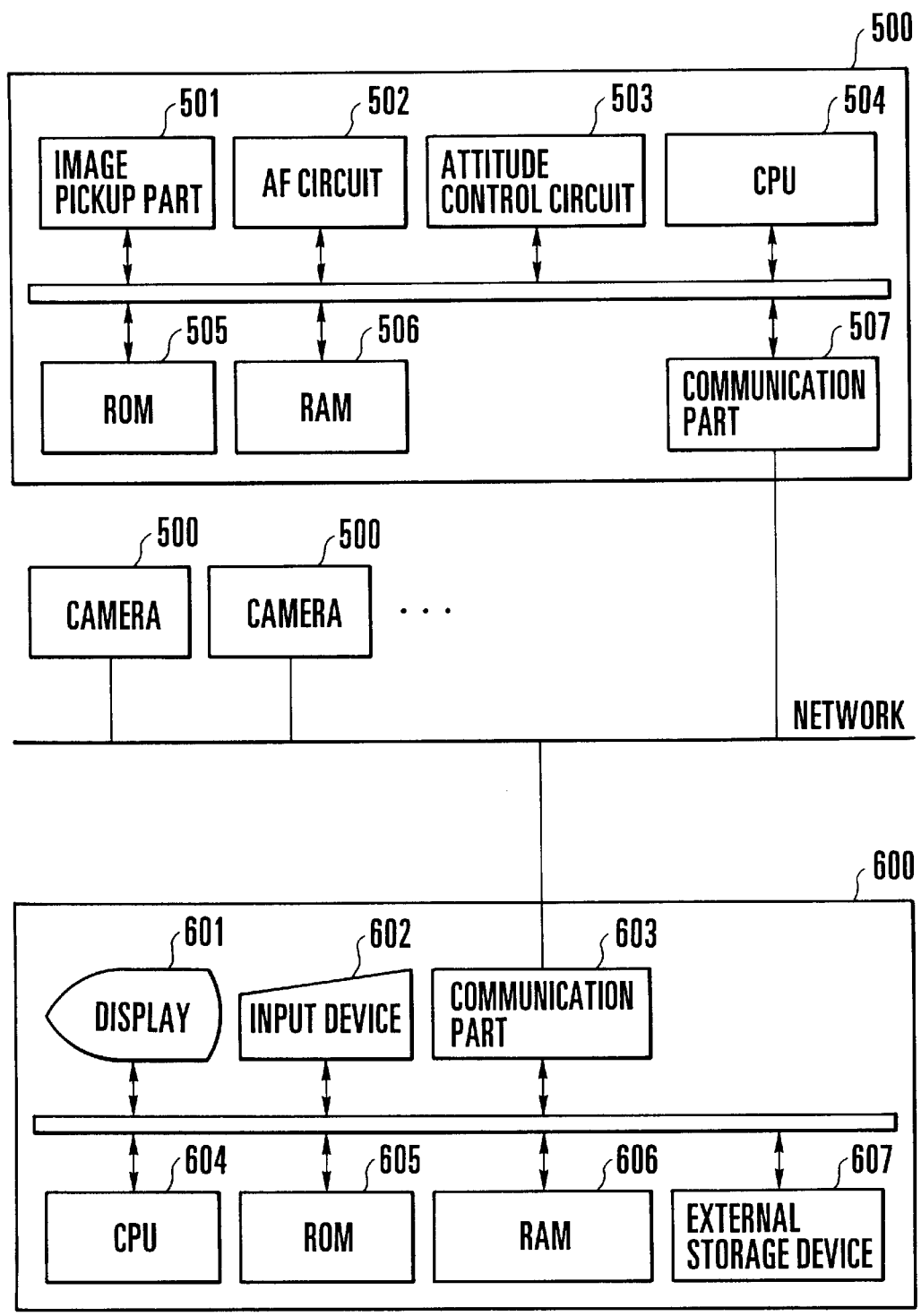
FIG. 7 is a block diagram showing the arrangement of a tracking camera system according to second, third and fourth embodiments of the invention.

FIG. 7 shows in a block diagram the arrangement of a tracking camera system according to the second embodiment. In FIG. 7, reference numeral 500 denotes a plurality of cameras, and reference numeral 600 denotes a computer terminal.

In each of the cameras 500, an image pickup part 501 is composed of a lens unit including a lens arranged to make focus adjustment (a focusing lens), etc., a diaphragm arranged to adjust quantity of light, and a CCD arranged to convert, into an electrical signal, an optical image incident thereon through the lens unit and the diaphragm.

An AF circuit 502 is arranged to extract a high frequency component of an image signal obtained from the CCD and to drive the focusing lens to move it to a position where the highest degree of image sharpness is obtained. In the case of the second embodiment, a parameter used for AF control is a pulse value of a stepping motor which is used for driving the focusing lens. The camera is, therefore, arranged to be capable of obtaining a focusing distance to an object of shooting by detecting a number of pulses which corresponds to a lens moving extent from a reference in-focus distance which is, for example, 1 m.

An attitude control circuit 503 is arranged to control the attitude (posture) of the camera, including the panning, tilting and zooming states of the camera, on the basis of attitude control parameters inputted from a communication part 507. The attitude control parameters in the case of the second embodiment include a pulse value of a motor which drives the camera 500 in the direction of panning as a parameter for panning control, a pulse value of a motor which drives the camera 500 in the direction of tilting as a parameter for tilting control, and a pulse value of a motor which drives a zoom lens as a parameter for zooming control. The state of attitude of the camera is grasped, like in the case of the AF control, by detecting a number of pulses of each of these motors corresponding to a lens moving extent from a reference position.

A CPU 504 performs overall control of the whole camera 500. The CPU 504 controls the image pickup part 501, the AF circuit 502 and the attitude control circuit 503 to cause them to adequately carry out their actions by sending commands to them or in response to control commands which are coming from the computer terminal 600.

A ROM 505 stores therein programs of varied kinds to be executed by the CPU 504. A RAM 506 is arranged to provide a program of processes to be executed within the camera 500 and the work area of the program or to provide a temporary standby area of video data inputted from the image pickup part 501 or data relative to commands coming from the computer terminal 600.

The communication part 507 is connected to the network and is arranged to send image data which has been subjected to predetermined processes such as a compression process, etc., to the computer terminal 600 and to exchange control commands and parameters relative to the camera 500 with the computer terminal 600.

In the computer terminal 600, a display 601 which is composed of a CRT or an LCD is arranged to display images picked up by the camera 500 on the basis of image data received. An input device 602 for inputting control commands is composed of a keyboard or a mouse which is used as a pointing device. A communication part 603 is arranged to receive the image data from the camera 500 and to exchange control commands with the camera 500.

A CPU 604 of the computer terminal 600 controls the whole of the computer terminal 600 and is arranged to read a program stored in a ROM 605 and to execute various control processes on the basis of the program read out. The ROM 605 stores therein various programs provided for execution of processes by the CPU 604. A RAM 606 is arranged to provide the work areas of the various programs or a temporary standby area of data inputted from the input device 602.

An external storage device 607, which is a FDD (floppy disk), a hard disk or a CD-ROM, stores therein a program for processes to be executed by the computer terminal 600. The processes can be carried out by reading out the program from the external storage device 607. In the second embodiment, a table of information on the initial attitudes of cameras is stored in a manner as shown in FIG. 5. At the start-up of the system, the state of attitude of each camera is grasped by reading and writing the values of the table into the RAM 606. The attitudes of the cameras are managed by rewriting these values.

The actions and processes of the tracking camera system according to the second embodiment are next described. Since the flow of processes to be executed in the second embodiment is the same as that of the first embodiment, the following description is given with reference again to the flow charts shown in FIGS. 2 to 4.

FIG. 2 shows a flow of the operation of the main loop to be executed after the start-up of the system. At a step S100 of FIG. 2, the whole system is initialized in the first place. The initialization mainly includes program reading and writing into the RAMs 506 and 606 and allotment of the work area to each of the processes to be executed. At a step S101, image data inputted from the image pickup part 501 is stored in the input image standby area of the RAM 506.

At the next step S102, a check is made to find if the system is in the tracking mode. In the case of the second embodiment, the check for the mode is made by making reference to values written in an area of variables of the RAM 606 indicating the state of the tracking mode. If the system is found to be in the tracking mode, the programmed control of the system shifts to a tracking process A. If not, the flow proceeds from the step S102 to a step S103. At the step S103, the image data stored in the RAM 506 is sent from the communication part 507.

On the side of the computer terminal 600, the image data received is stored in the RAM 606 through the communication part 603. The content of the image data is then sent to the display 601. The steps S101, S102 and S103 are repeated until the operation of the system comes to an end.

In a case where the control shifts to the process A, the flow returns to a process B after completion of a tracking process described later herein.

An operation to be executed on the system on the side of the computer terminal 600 is next described. FIG. 3 shows a flow of operation performed to execute commands inputted through the input device 602.

At a step S200 of FIG. 3, a command inputted is analyzed to find if it is a command for change-over from one camera to another. If so, the flow proceeds to a step S201. At the step S201, a process is executed to change the use of camera from one camera over to another. The camera change-over is made with the network connection of the computer terminal 600 changed from the camera in use over to another camera 500 by the communication part 603.

If the command is found at the step S200 to be not the camera change-over command, the flow of operation proceeds from the step S200 to a step S202. At the step S202, a check is made to find if the input command is an attitude control command. If so, the flow proceeds to a step S203. At the step S203, the values of parameters for panning, tilting and zooming are obtained. However, the command might be only for a change of panning or tilting or might be for both panning and tilting. At the step S203, therefore, only such a parameter or parameters that are required by the command is obtained. At a step S204, an attitude control command is prepared by adding the values of the parameters obtained to the command. The attitude control command is then sent from the computer terminal 600 to the camera 500 through the communication parts 507 and 607. Upon receipt of the attitude control command, the camera 500 writes the contents of the attitude control command into the RAM 506. Then, the CPU 505 causes the attitude control circuit 503 to carry out the command by making reference to the contents of the RAM 506.

If the input command is found at the step S202 to be not the attitude control command, the flow proceeds from the step S202 to a step S205. At the step S205, a check is made to find if the input command is a command for the tracking mode. In the case of the second embodiment, the tracking mode is set as follows. The position of a cursor (such as a mouse cursor) of the pointing device is shifted to an object of tracking included in the image displayed on the display 601. In the case of a mouse, the mouse is clicked at the object to instruct for the start of the tracking mode, and the process of tracking begins. Then, the tracking object is detected on the basis of information on the color of pixels located around the cursor when the mouse is clicked. The tracking method usable for this system is not limited to a specific method such as the one described above. This system can be arranged to use any tracking method as desired. In canceling the tracking mode with the system set in the tracking mode, the mouse cursor is moved to an arbitrary part of the video image displayed on the display 601 and the mouse is clicked there.

If the input command is found at the step S205 to be the tracking setting command, the flow proceeds to a step S206. At the step S206, a discrimination is made between the start of the tracking mode and the cancellation of the tracking mode. In the case of the second embodiment, an area of variables is arranged within the RAM 606 to show the current mode by the value of a variable stored in this area. For example, the system is judged to be in the normal mode when the variable of this area is at "0" and to be in the tracking mode when the variable is at "1". If the command for the tracking mode is judged at the step S206 to be for the start of the tracking mode, the flow proceeds to a step S207 to write "ON" or "1" into the area of a variable which shows the state of the tracking mode. If the command for the tracking mode is judged to be for the cancellation, the flow proceeds from the step S206 to a step S208 to write "OFF" or "0" into that area.

After execution of the step S207 with the command for the tracking mode judged to be for a start, the flow proceeds from the step S207 to a step S209. At the step S209, the position where the mouse has been clicked is obtained as information representing a feature of the tracking object. Then, information on the color of pixels around that position is stored in the RAM 606.

Further, if the input command is found at the step S205 to be not the tracking setting command, the command is considered to be a system operation ending command. In that case, a process for terminating the operation of the system is executed.

As described above, the processes of the steps S200 to S209 are handled as interruption processes to be allowed while the main loop of flow shown in FIG. 2 is in process. After completion of the interruption handling routine, the flow of operation returns to a part of the program where the interruption is allowed.

An operation of the system to be carried out in the tracking mode is next described with reference to FIG. 4, which is a flow chart showing the operation of the system to be carried out in the tracking mode.

At a step S300 of FIG. 4, the position of the object of tracking is first detected on the basis of video data inputted from the image pickup part 501 and information on the feature of the tracking object obtained at the above-stated step S209. In the case of the second embodiment, the information on the color of pixels around a designated pixel, i.e., a pixel of the video image at which the mouse is clicked, is used as a feature of the tracking object, as mentioned above. The movement of the object (a position to which the object have moved) is, therefore, detected by detecting a part to which the designated pixel has moved.

At a step S301, the values of attitude control parameters required for varying the attitude of the camera are computed in such a way as to have the moving position of the object of tracking at the center of a video image. In other words, the second embodiment is arranged to have the tracking object always displayed in the middle part of a video image picked up by the camera.

At a step S302, a check is made to find if it is necessary to change the camera currently in use over to another camera. The camera currently in use is changed over to another camera when its posture (attitude) comes to exceed the maximum left or right position of panning or the maximum upper or lower position of tilting. In other words, use of one camera is changed over to use of another when it becomes no longer possible to have the image of the tracking object at the center of the video image by panning or tilting the camera currently in use under the attitude control. With the use of one camera thus decided to be changed over to another, one of the other cameras is selected by making reference to the table of information on the initial attitudes of cameras as shown in FIG. 5 in such a way as to select a camera capable of capturing the tacking object at the center of a video image.

If the camera change-over is found at the step S302 to be necessary, the flow of operation proceeds to a step S303. At the step S303, the CPU 604 selects one of the other cameras by making reference to information on the position of the tracking object obtained at the step S301 and also to the table of information on the initial attitudes of cameras stored in the RAM 606. The CPU 604 then changes the network connection of the communication part 603 to the camera over to another camera 500. If the camera change-over is found at the step S302 to be not necessary, the flow proceeds from the step S302 to a step S305 to execute the process of the step S305.

At a step S304, the values of attitude control parameters required for varying the posture of the camera selected are computed. The method by which the values of the attitude control parameters are computed in the second embodiment of the invention is the same as the method of the first embodiment described in the foregoing with reference to FIG. 6.

At the step S305, a camera control command is prepared on the basis of the values of the attitude control parameters (for panning, tilting and zooming magnification) obtained at the step S301 or S304. The camera control command thus prepared is sent to the camera 500. In this instance, the values of the attitude control parameters are stored in the RAM 606. The computation of the attitude control parameter values and the preparation and sending of the command are performed with a program written in the ROM 605 executed by the CPU 604.

With the camera control command received by the camera 500, the AF circuit 502 performs an AF action on a new position obtained after the posture of the camera is changed. Then, a flag indicating whether or not the AF action has been completed and information on an in-focus distance obtained at that time are stored in the RAM 506.

At the next step S306, the computer terminal 600 makes an enquiry about the state of focusing. The enquiry process is made by checking an area of the RAM 506 where the flag indicating whether or not the AF action has been completed is stored. More specifically, a state-referring command enquiring the state of the camera (the state-of-focus indicating flag and the in-focus distance, in this case) is sent to the camera 500 to obtain various values in reply to the command. This communication is conducted by the CPU 504 and the CPU 604 respectively through the communication parts 603 and 507.

At a step S307, a check is made to find if the camera is in an in-focus state. If so, i.e., if the AF completion flag is found in its on-state, the flow proceeds from the step S307 to a step S308. At the step S308, information on an in-focus distance is obtained and is written into the RAM 606. If not, i.e., if the AF completion flag is found in its off-state, the flow returns from the step S307 to the step S306 to repeat the process of making the enquiry. If no in-focus state of the camera is found for a predetermined period of time by the repeated enquiry, the attempt to obtain an in-focus distance is given up by carrying out a time-out process. In that instance, an in-focus distance last obtained is retained as it is.

Each of the first and second embodiments is arranged to change the use of the camera from one camera over to another when the posture of the camera in pursuit of the tracking object comes to the limit of panning or tilting by selecting another camera which is capable of capturing and keeping the tracking object correctly at the center of an image plane after the camera change-over. Therefore, the arrangement enables the tracking camera system to efficiently carry on the pursuit of the tracking object without missing it by virtue of the camera change-over.

Further, each of the first and second embodiments is arranged to change one video image over to another with the ratio of area occupied by the image of the tracking object to the whole video image kept relatively constant by adjusting the zooming magnification of the camera. The tracking work thus can be smoothly performed with improved efficiency.

Third and fourth embodiments of the invention are next described below.

With the tracking camera system arranged as shown in FIG. 7, the information on the current attitude (including setting position, setting direction and panned, tilted and zoomed states) of each camera 500 is manageable by one of two conceivable methods. In one method, the computer terminal 600 is arranged to perform centralized control over all cameras by using a table of information on postures or attitudes of all the cameras. In the other method, the computer terminal 600 is arranged to perform decentralized control over information by making enquiries about information on the attitude of each of the cameras 500 as necessary.

The method whereby the computer terminal 600 performs centralized control by using the table of information on the attitudes of all the cameras 500 is first described as the third embodiment of the invention.

Information on the setting position and setting direction of each of the cameras 500 is managed as follows. When each of the cameras 500 is set, the position and direction of the camera are obtained from a polar coordinate system with respect to a reference position. For example, when the camera is assumed to be set inside of a room, the reference position is set to a corner of the room (for example, a northeast corner formed by a floor and walls) and is defined by coordinates (0, 0, 0). Further, the direction toward the camera 500 with respect to a reference direction as viewed from the reference position (for example, the due north and horizontal direction defined by the angles (0, 0)) is expressed by the angles ($\phi$, $\theta$). Therefore, the position of the camera 500 is expressed by a distance "r" from the reference position and the angles ($\phi$, $\theta$) with respect to the reference direction.

Further, assuming that the panning and tilting angles are both at zero degree when the camera 500 is at home positions of panning and tilting which are normally in front of a panhead and horizontal, the shooting direction of the camera 500 at the home positions is expressed as (Pan$_0$, Tilt$_0$).

Figure 8:
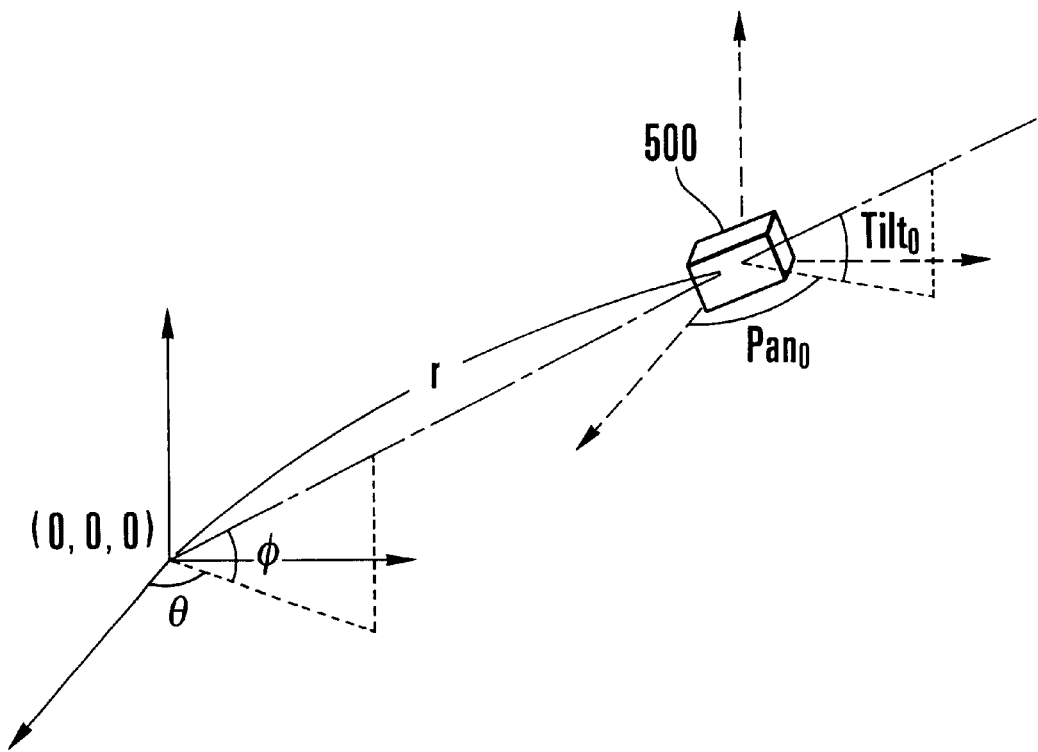
FIG. 8 is a diagram for explaining the method of expressing the setting position and the setting direction of a camera according to the third embodiment of the invention.

FIG. 8 shows the method of expressing the position and direction of the camera 500.

Information about the setting of the cameras 500 is registered in a setting information table as shown in FIG. 9. The processes for registering and deleting the information will be described later herein.

In the third embodiment, the setting information table as shown in FIG. 9 is stored in the external storage device 607 of the computer terminal 600 shown in FIG. 7 and is read out and written into the RAM 606 by the system initializing process of the step S100 of FIG. 2. Upon completion of the operation of the system, the setting information table written in the RAM 606 is written back into the external storage device 607. By this, the setting information table is kept in an updated state.

The registration and deletion of the information on setting of the cameras 500 are next described below.

Figure 11:
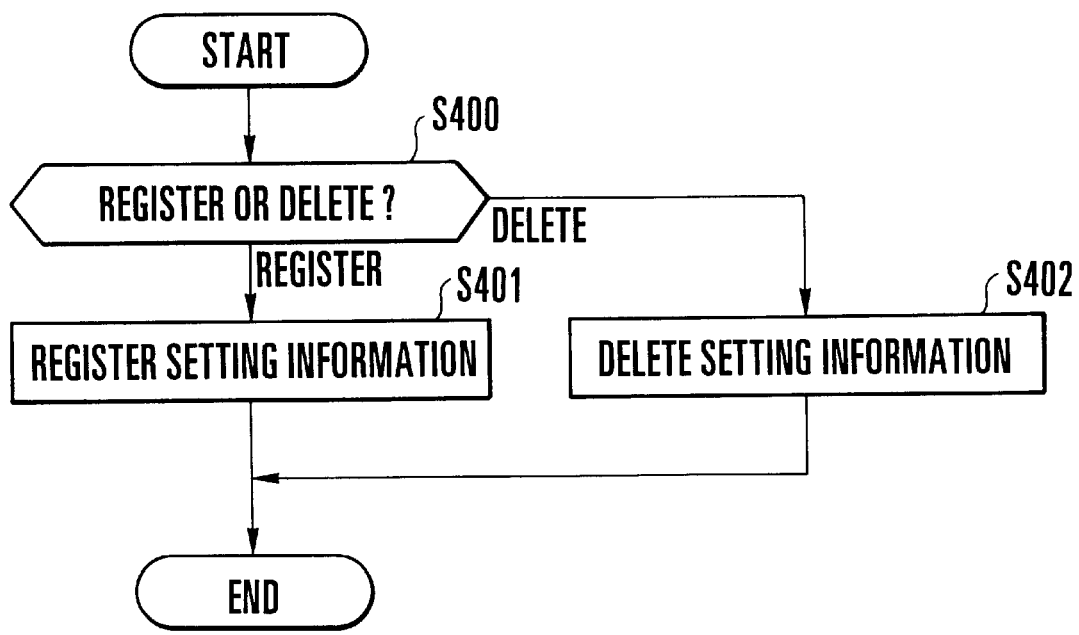
FIG. 11 is a flow chart showing the operation to be executed by a computer in processing the setting information of a camera.

In the command analysis routine of FIG. 3, if the input command is found to be a command relative to the camera setting information, a setting information processing routine is executed as shown in FIG. 11.

At a step S400 of FIG. 11, a check is made to find whether the command is for registration or deletion of the information on setting of the camera 500. If the command is found to be for registration, the flow of operation proceeds to a step S401 to execute a process of registering the camera setting information.

The camera setting information includes the position (r, $\phi$, $\theta$) and the direction (Pan$_0$, Tilt$_0$) of the camera 500, as mentioned above. These information values are, therefore, added to the setting information table stored in the RAM 606 in accordance with the setting information designated by the command and the camera ID. In this case, the command is assumed to be designating the camera ID, the position of the camera and the direction of the camera.

If the command is found at the step S400 to be for deletion of the camera setting information, the flow proceeds from the step S400 to a step S402. At the step S402, a camera-setting-information deleting process is executed. More specifically, the information on setting of the camera 500 is deleted, according to the camera ID designated by the command, from the setting information table stored in the RAM 606. In a case where the part deleted is located at an intermediate part of the table, a vacancy created by the deleted part is closed up with adjacent parts of the table.

Upon completion of the step S401 or S402, the setting information processing routine is terminated.

The method for managing geometric information on the camera 500 (panning, tilting and zooming operations on the camera) is next described as follows.

The geometric information on the camera 500 is caused to vary by the action of tracking an object or by a remote operation on the camera 500 from outside. When the geometric information varies, new geometric information on the camera 500 is sent from the camera 500 to the computer terminal 600 by communication. The geometric information on the camera 500 is managed by preparing a geometric information table as shown in FIG. 10. When the system is initialized, the geometric information table is initialized at the computer terminal 600 and is stored in the RAM 606.

Figure 12:
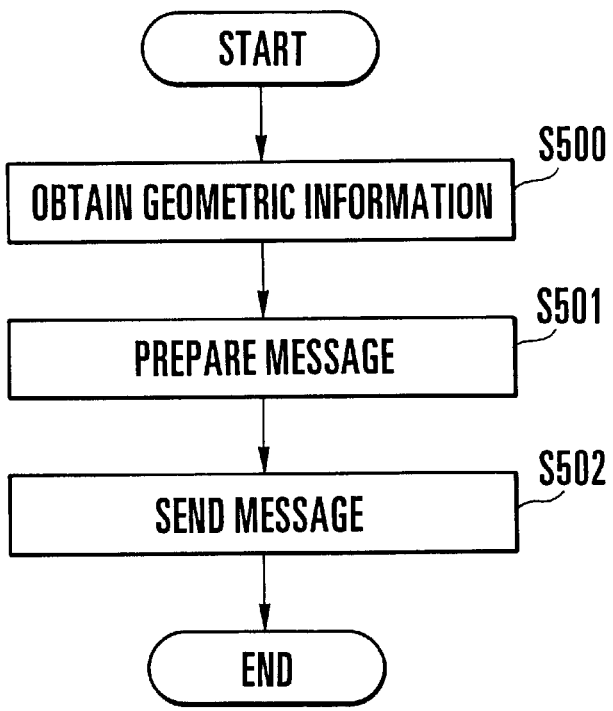
FIG. 12 is a flow chart showing the operation to be executed by a camera when the geometric state of the camera changes.

FIG. 12 is a flow chart showing processes to be executed by the camera 500 itself when the geometric information of the camera 500 varies. At a step S500 of FIG. 12, the CPU 504 obtains, according to a program read and stored in the RAM 506, the current geometric information of the camera 500. In the third embodiment, the attitude control circuit 503 is arranged such that, when the attitude control is carried out, the attitude control circuit 503 writes the result of the attitude control into the RAM 506.

Figure 13:
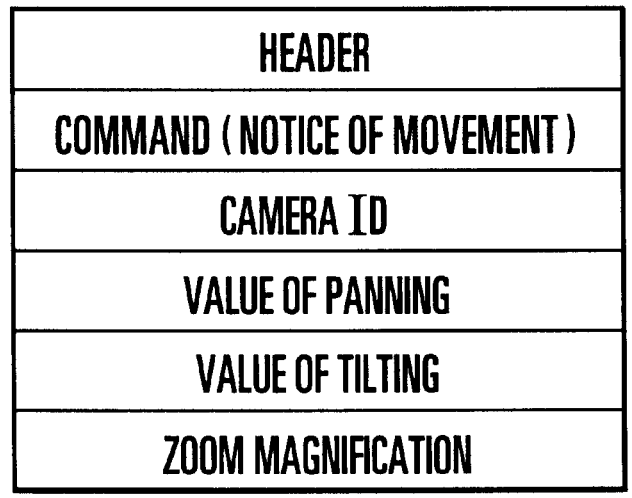
FIG. 13 is a diagram showing the format of a message with which the camera notifies the computer of a change in the geometric state of the camera.

Further, the geometric information is expressed in the pulse values of the motors used for panning, tilting and zooming, as mentioned in the foregoing. Therefore, the geometric information obtained at the step S500 is in the form of pulse values of the respective motors. At a step S501, a message is prepared in a format as shown in FIG. 13. In the format of message, current pulse values of the respective motors are written into parts provided for the values of panning and tilting and the magnification of zooming as applicable. At a step S502, the message prepared at the step S501 is sent to the computer terminal 600.

Figure 14:
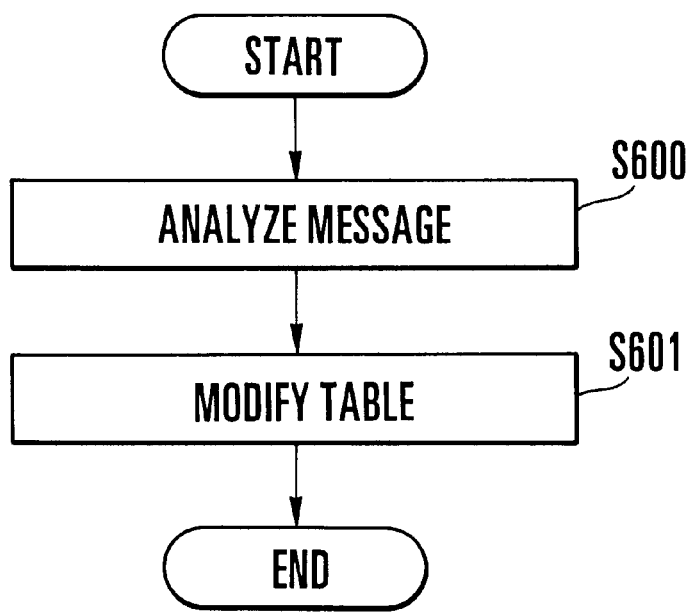
FIG. 14 is a flow chart showing the operation to be executed by the computer when the message for a change in the geometric state is received from the camera.

FIG. 14 is a flow chart showing processes to be executed by the computer terminal 600 when the message indicative of a change of the geometric information is received from the camera 500.

At a step S600 of FIG. 14, the CPU 604 analyzes the message received according to the program read and stored into the RAM 606. In other words, each of values of the geometric information described in the message (the panning value, tilting value and zooming magnification) is read by the CPU 604. At a step S601, the geometric information read at the step S600 is written into the geometric information table described above referring to FIG. 10. The camera ID of the camera 500 from which the message is sent is described in the message. Therefore, each part of the geometric information table that corresponds to the camera ID is thus updated.

Next, processes to be executed by the computer terminal 600 in issuing a command to the camera 500 to move in pursuit of a tracking object when the system is in the object tracking mode are described below.

Figure 15:
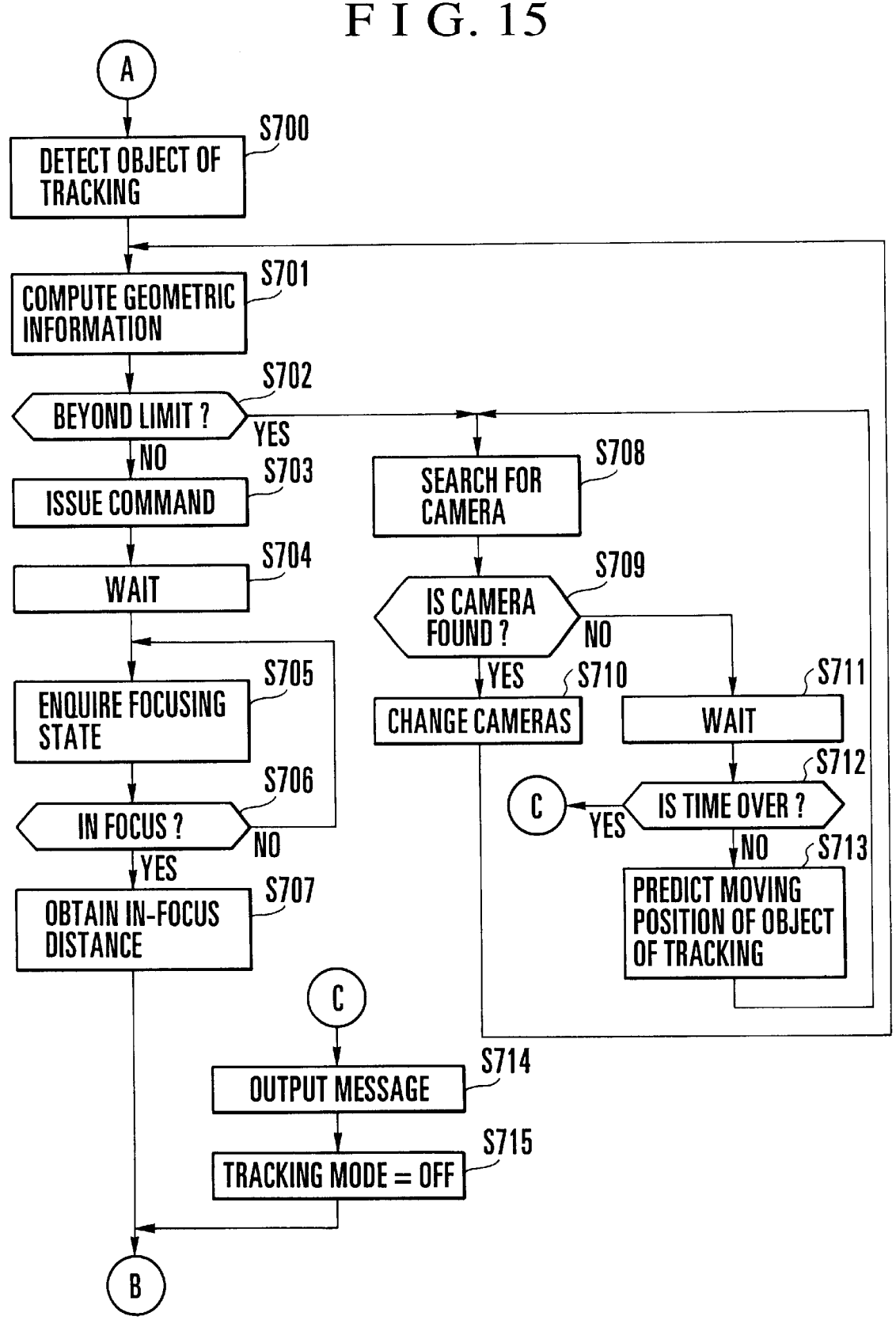
FIG. 15 is a flow chart showing the operation to be executed by the system in the tracking mode.

FIG. 15 is a flow chart showing processes to be carried out by the system in the tracking mode. In the case of FIG. 15, processes to be carried out when the object tracking becomes impossible with any of the cameras are added to the processes of the first and second embodiments described in the foregoing with reference to FIG. 4.

At a step S700 of FIG. 15, the position of the object of tracking on an image plane is detected on the basis of an image input and information on the feature of the tracking object. The details of the method of obtaining the information on the feature of the tracking object are the same as what has been described above with respect to the first embodiment and are, therefore, omitted here. At a step S701, geometric information required for varying the attitude (posture) of the camera in such a way as to have the moving position of the tracking object obtained at the step S700 placed at the center of the image plane is computed. At a step S702, a check is made to find if the result of computation made at the step S701 has exceeded a variable range of attitude, i.e., the limit of panning or tilting.

Figure 16:
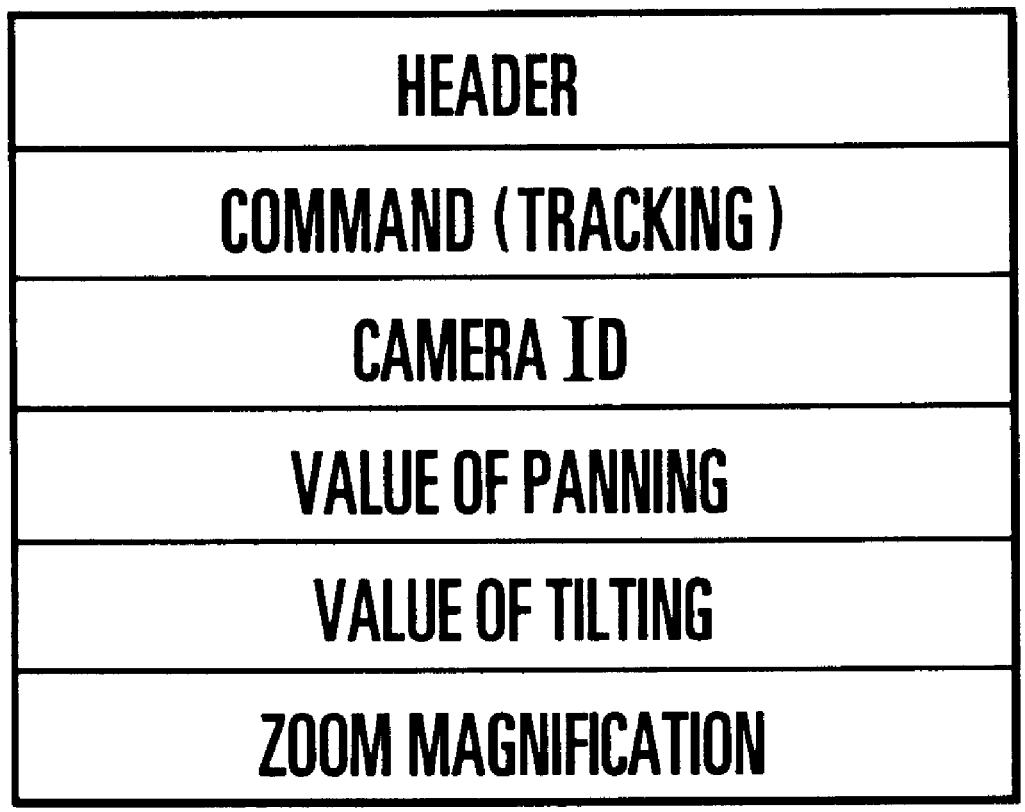
FIG. 16 is a diagram showing the format of a tracking message for issuing a command for changing the geometric state of the camera.

If not, the tracking object can be tracked with the camera 500 currently in use, and the flow proceeds to a step S703. At the step S703, a command is prepared for varying the attitude of the camera 500. The command is sent to the camera 500. FIG. 16 shows the format of the command to be issued in this instance. In other words, a panning value, a tilting value and a magnification of zooming are written in on the basis of the geometric information computed at the step S700.

At a step S704, the flow of operation waits for a predetermined period of time, which is a standby time provided for waiting until completion of an attitude varying process at the camera 500 after receipt of the attitude varying command. In the case of the third embodiment, this step is executed by a timer function of the computer terminal 600, which any ordinary computer is provided with.

At the next step S705, an enquiry is made for the focusing state of the camera 500. Then, at a step S706, a check is made to find if the camera 500 is in focus. If the camera 500 is found to be in focus, the flow proceeds to a step S707 to store in the RAM 606 information on an in-focus distance obtained. The details of the manner in which an in-focus state is decided and the information on the in-focus distance is obtained are the same as what has already been described in the foregoing with respect to the first embodiment and are, therefore, omitted here.

If the result of computation made at the step S701 is found at the step S702 to have exceeded the attitude variable range, the flow proceeds from the step S702 to a step S708. At the step S708, a search is made for any of other cameras 500 that is capable of shooting the tracking object within the attitude variable range. This search is made by making reference to the table of FIG. 9 which shows information on setting of the cameras 500. At the next step S709, a check is made for the result of the search for one of the cameras 500. If a camera usable for tracking the object is found from among the cameras 500, the camera 500 currently in use is replaced with the usable camera 500 at a step S710. The camera change-over is effected by storing the camera ID of the camera usable for tracking in the RAM 606. After the camera change-over, the flow returns from the step S710 to the step S701 to execute the steps all over again from the step S701.

If no usable camera is found at the step S709, the flow proceeds from the step S709 to a step S711. At the step S711, the flow of operation waits for a predetermined period of standby time. This standby time is provided because the tracking object might move to come into the attitude variable range of any of the cameras 500. The standby time varies with the environment under which the system is operating and also with the tracking object. The standby time is, therefore, arranged to be inputted by the user of the system through the input device 602. The standby time is stored in the RAM 606 by adding it to a standby time last used for waiting. At a step S712, a check is made to find if the sum of standby time has exceeded a predetermined period of time. This step is provided for preventing the processes of the steps S708 to S713 from being endlessly repeated.

If the predetermined period of time is found at the step S712 to be not exceeded, the flow proceeds from the step S712 to a step S713. At the step S713, a position of the object predicted to be obtained after the lapse of a predetermined time is predictively computed. For this step, it is necessary to have information on the last position of the object stored and to compute a moving speed of the object from the moving amount of the object. However, the value of the moving speed is computable by using information on an in-focus distance last obtained for the object and stored at the RAM 606.

Figure 17:
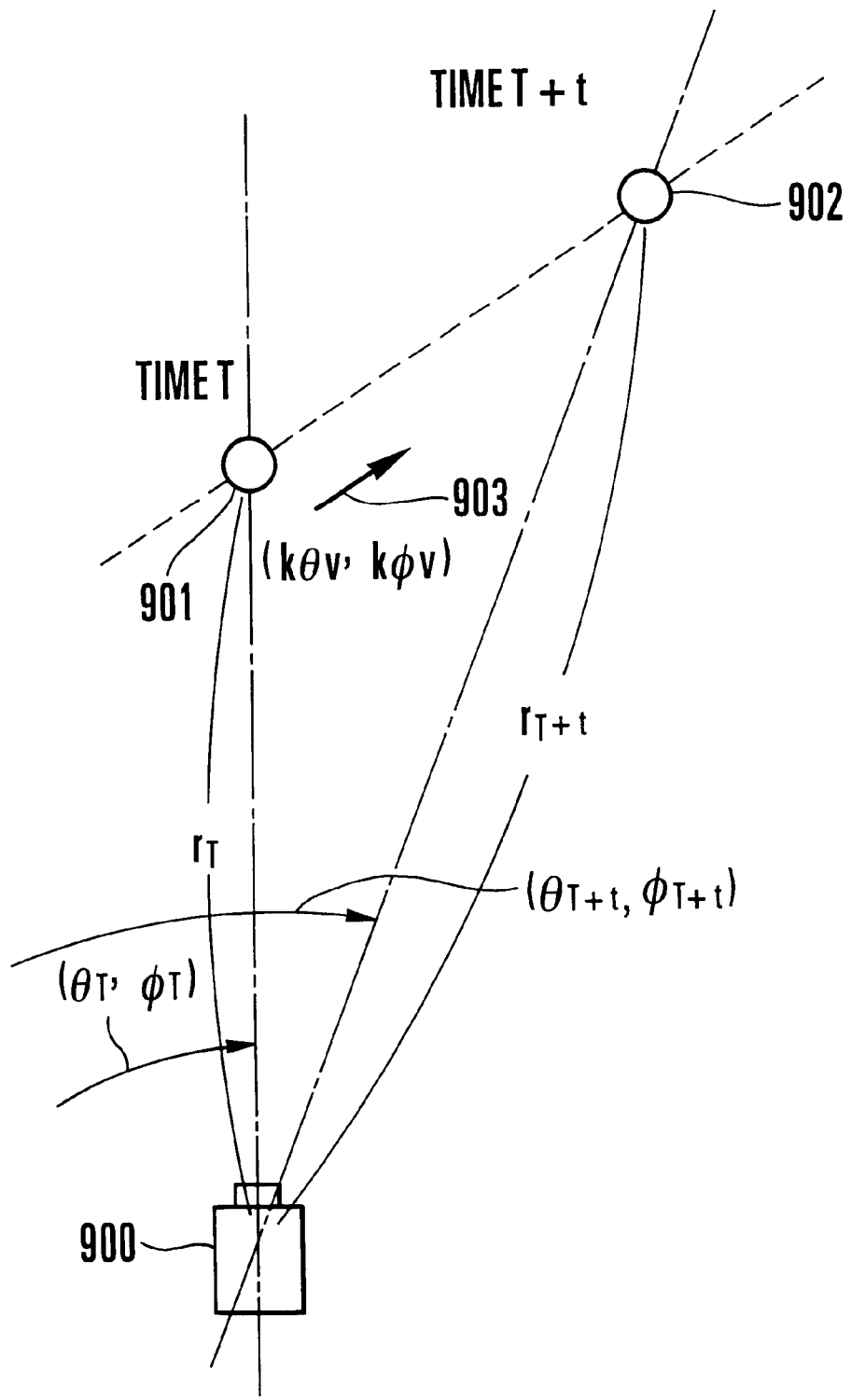
FIG. 17 is a diagram for explaining the method of predicting the position of an object which will be obtained after the lapse of time "t".

FIG. 17 is a diagram for explaining a method for computing a predicted moving position of the object. In FIG. 17, reference numeral 900 denotes the camera, reference numeral 901 denotes a position of the object at a time point T, reference numeral 902 denotes a position of the object at another time point T+t, and an arrow 903 represents the moving speed and moving direction of the object. The time point T is a point at which the standby state begins. The time point T+t is a point where the standby state comes to an end. In other words, at the time point T, the object is found to be located at a position $(r_T, \theta_T, \phi_T)$. Then, with the moving speed and direction $(k\theta_v, k\phi_v)$ of the object assumed to be known from the last object position, the position $(r_{t+t}, \theta_{T;t}, \phi_{T;t})$ of the object at the time point T+t where the standby state comes to an end can be obtained from the following formula:

$$r_{T+t}\begin{bmatrix}\cos\theta_{T+t}\cos\phi_{T+t}\\\sin\theta_{T+t}\cos\phi_{T+t}\\\sin\phi_{T+t}\end{bmatrix}=r_T\begin{bmatrix}\cos\theta_T\cos\phi_T\\\sin\theta_T\cos\phi_T\\\sin\phi_T\end{bmatrix}+tk\begin{bmatrix}\cos\theta_V\cos\phi_V\\\sin\theta_V\cos\phi_V\\\sin\phi_V\end{bmatrix}$$

After completion of the computing operation of the step S713, the flow returns to the step S708 to repeat the steps described above.

If the total standby time is found at the step S712 to be in excess of the predetermined time, the flow proceeds from the step S712 to a step S714. At the step S714, a message indicating that the object is no longer trackable is outputted and displayed on the display 601. At a step S715, the tracking mode is turned off to forcibly terminate the tracking operation.

The third embodiment is arranged, as described above, to grasp the current state of the camera 500 and to permit changing the object tracking camera from one camera over to another with a table of information on the set state of each camera 500 and a table of geometric information on each camera 500 centrally managed by the computer terminal 600. In a case where the tracking object is judged to be not trackable, a moving position of the object is predicted and a camera which is most suited for capturing the object at the predicted moving position is selected from among other cameras.

A tracking camera system according to the fourth embodiment of the invention is next described with reference to FIG. 7. In the fourth embodiment, however, the computer terminal 600 have no table of information on the state of setting of each camera nor any table of geometric information on each of the cameras 500 and is arranged to manage information on the attitude of each camera 500 in a decentralized manner.

The manner in which the information on the state of setting of each camera 500 is managed in the fourth embodiment is first described. In setting the camera 500, the setting position and setting direction of the camera 500 is obtained from a polar coordinate system, as mentioned in the foregoing. Information on the state of setting is written into the RAM 506 of the camera 500.

In the fourth embodiment, the information on the state of setting of each of the cameras 500 is obtained by connecting an input device (a keyboard or a pointing device) to the communication part 507 of the camera 500 either directly or through the computer. Further, a means for obtaining information on the position and direction of the camera by using a built-in sensor may be provided. Further, a part of the RAM 506 is arranged to keep stored data unerased even when the power supply of the camera is switched off. The data can be retained by means of a built-in power source, such as a battery which is not shown. The fourth embodiment is arranged to keep the setting information updated by obtaining the information every time the camera 500 moves.

As for the geometric information on the camera 500, each of the cameras 500 is provided with means for obtaining the current geometric information on itself. It is, therefore, not necessary to store the values of the geometric information.

The fourth embodiment which is arranged in the above manner changes the object tracking camera from one camera over to another in the following manner.

In the system, the computer terminal 600 must select one of the cameras 500 by a certain method. Therefore, the user sets an approximate value of the direction in which a desired object is located and inputs information necessary for preparation of a message in the format as shown in FIG. 18.

Figure 19:
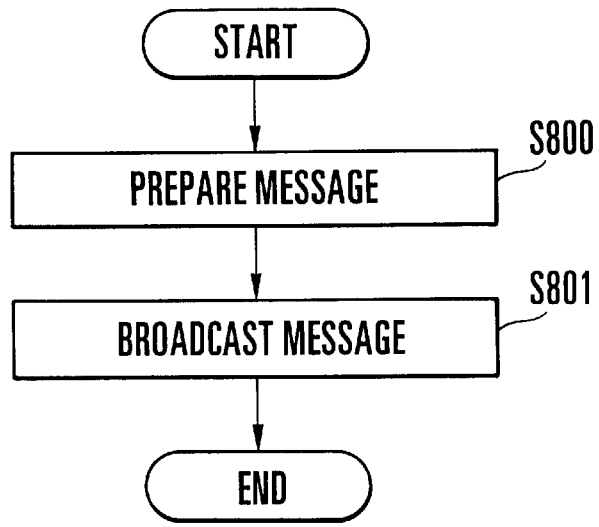
FIG. 19 is a flow chart showing the operation to be executed by a computer when an initial camera is selected according to the fourth embodiment of the invention.

FIG. 19 is a flow chart showing processes to be executed at the computer terminal 600 in selecting a camera to be initially used by the user. When the system is instructed by the user to make a search for the camera to be initially used, the processes of FIG. 19 is executed.

At a step S800 of FIG. 19, a message is prepared in the format shown in FIG. 18. It is assumed that the user has inputted, before designating this message as a command, the coordinates of an object (defining a viewing position desired) and the moving direction of the object ("0" is designated in this instance, because the system is not in the object tracking mode as yet) to have these values stored in the RAM 606.

The message is, therefore, prepared at the step S800 on the basis of the values of the coordinates of the position and the moving direction of the object stored in the RAM 606. Since this message is an evaluation requesting command, the ID of the command is also written into the message. The manner in which evaluation is to be made in response to this command will be described later herein.

At the next step S801, the message prepared at the step S800 is broadcasted through the network. Since the number of cameras and whereabouts of them are assumed to be unknown, the message is sent out by broadcasting. Accordingly, the camera 500 is assumed to be always making a check for the broadcast message in the case of the fourth embodiment.

Figure 20:
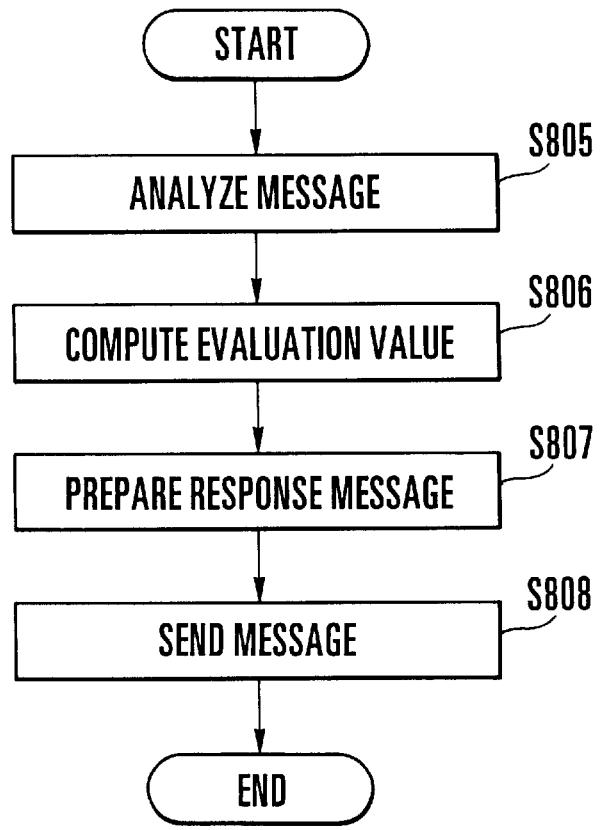
FIG. 20 is a flow chart showing the operation to be executed by the camera when the evaluation-value requesting message is received.

FIG. 20 is a flow chart showing processes to be executed at the camera 500 with the evaluation requesting command mentioned above received by the camera 500.

At a step S805 of FIG. 20, the command received is analyzed. Then, the values of the coordinates of the object and the moving direction of the object are stored in the RAM 506. At the next step S806, an evaluation value relative to whether or not the object is shootable is computed.

The method for computing the evaluation value is described below with reference to FIGS. 21 and 22.

Figure 21:
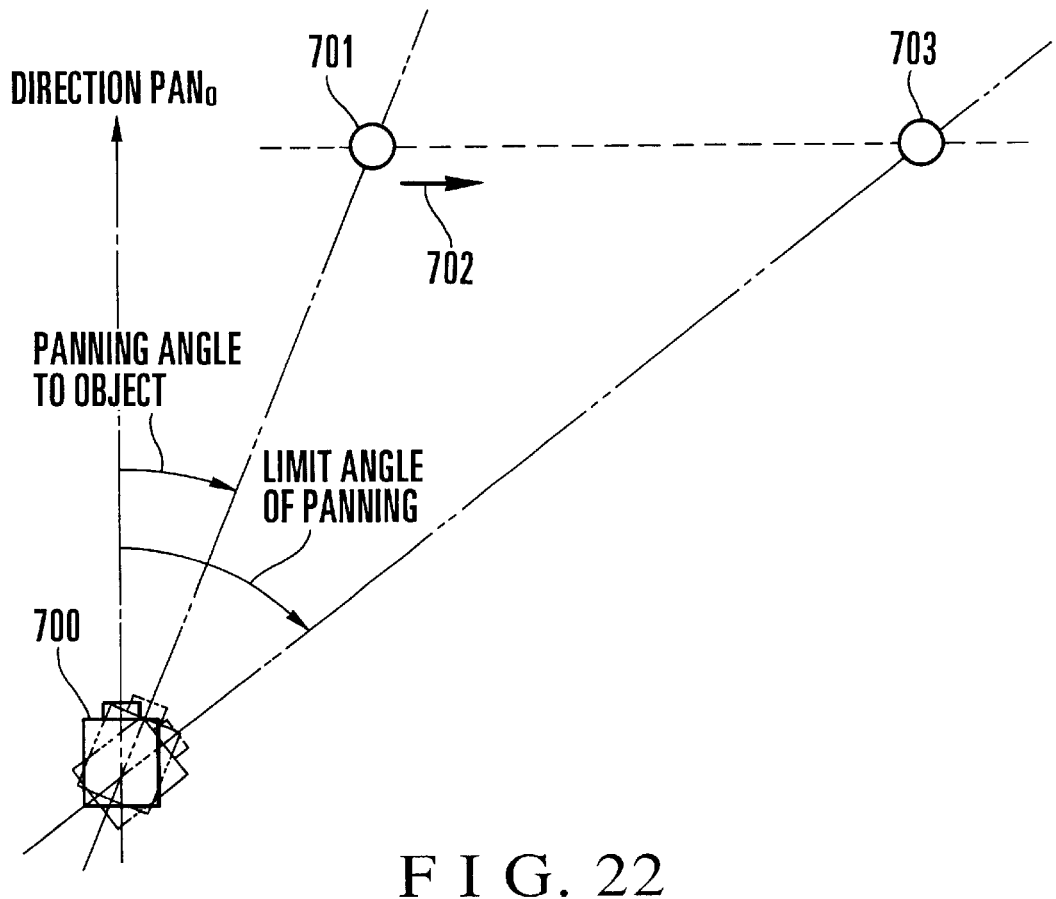
FIG. 21 is a diagram showing a positional relation between a camera and an object of tracking.

FIG. 21 shows a relation between the camera and the object designated. For the sake of simplification of illustration, FIG. 21 shows the relation on a plane as viewed vertically from above the camera.

In FIG. 21, reference numeral 700 denotes the camera. Reference numeral 701 denotes the current position of the object designated. Reference numeral 702 denotes the moving direction and moving speed of the object. Reference numeral 703 denotes the object position obtained when the posture of the camera reaches a panning limit. Under this condition, a period of time required for arrival of the object at the position 703 with the camera on the movement continuously at the speed 702 is computed. A computing operation on the period of time required in the tilting direction is performed also in the same manner as in the case of panning. However, it is necessary to consider which of panning and tilting will reach its limit earlier than the other.

Figure 22:
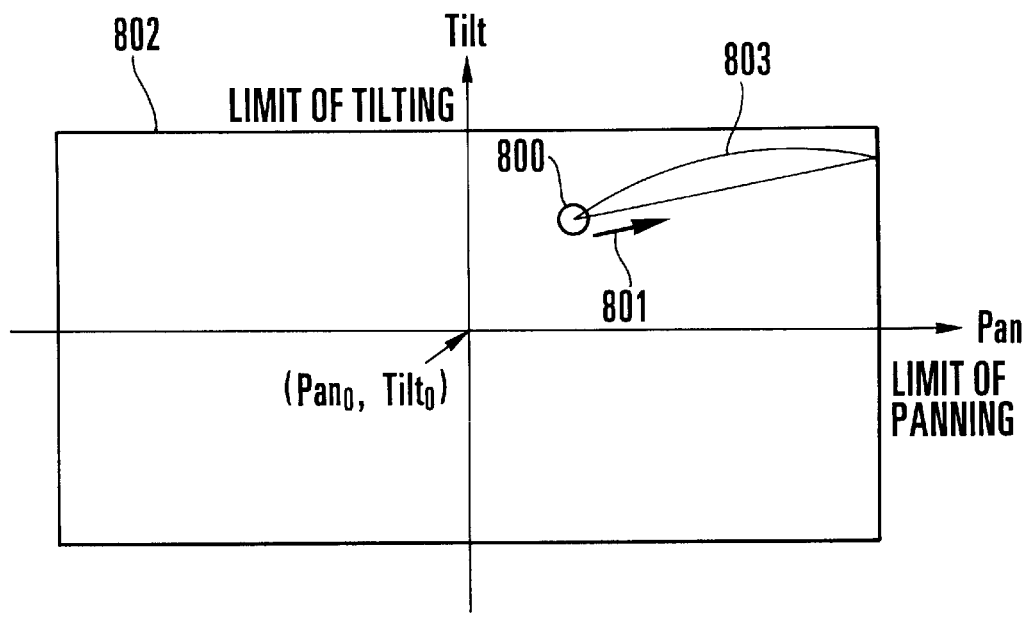
FIG. 22 is a diagram showing panning and tilting limits of a camera as in relation to an object of tracking.

FIG. 22 shows a relation between the panning and tilting directions of the camera and the position of the object. In FIG. 22, reference numeral 800 denotes the position of the object. In the case of FIG. 22, the position of the object is shown as viewed only from a camera position where the camera is at zero panning and zero tilting positions ($Pan_0$ and $Tilt_0$). Reference numeral 801 denotes the moving direction and moving speed of the object. Reference numeral 802 denotes a frame showing limit angles of panning and tilting. Reference numeral 803 denotes a locus obtained when the object moves in the moving direction 801 and at the moving speed 801. In the example shown in FIG. 22, the motion locus 803 of the object is hitting the panning limit. Therefore, panning of the camera reaches its limit earlier than tilting of the camera in the case of FIG. 22. Hence, a period of time required before arrival at the panning limit is selected as the evaluation value mentioned above with reference to FIG. 20.

Figure 23:
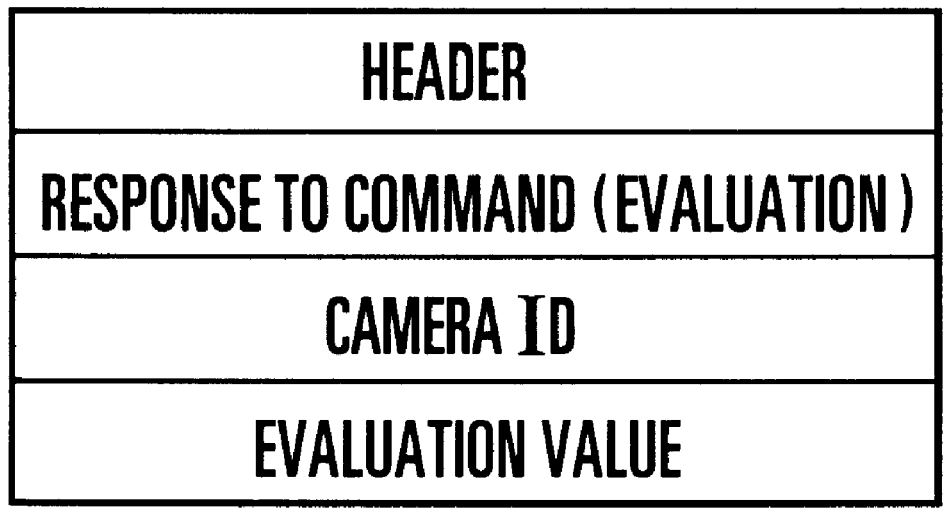
FIG. 23 is a diagram showing the format of a response message to be sent in response to the evaluation-value requesting message.

Referring again to FIG. 20, at a step S807, a response message is prepared in the format as shown in FIG. 23. The value computed and obtained at the step S806 is written into the response message as an evaluation value. At a step S808, the message prepared at the step S807 is sent from the camera 500 to the computer terminal 600.

Processes to be executed further in addition to the above-stated processes when the computer terminal 600 is in the object tracking mode are described below with reference to FIG. 24, which is a flow chart.

Figure 24:
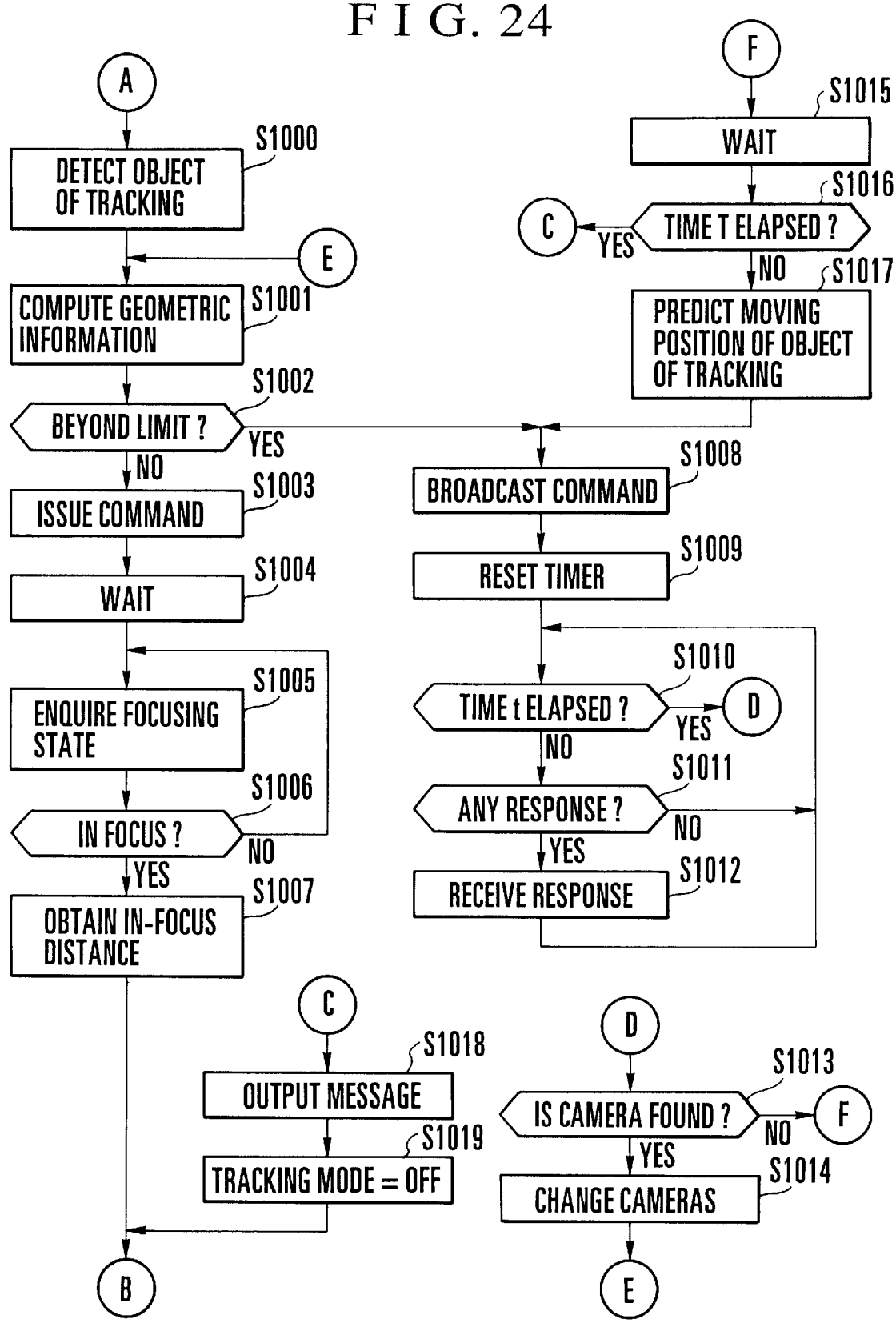
FIG. 24 is a flow chart showing the operation to be executed by the system in the tracking mode.

At a step S1000 of FIG. 24, the position of the object of tracking on an image plane is detected on the basis of an image input and information on the feature of the tracking object. The details of the method of obtaining the information on the feature of the tracking object are the same as what has been described above with respect to the first embodiment and are, therefore, omitted here.

At a step S1001, geometric information required for varying the attitude of the camera 500 to have the moving position of the tracking object obtained at the step S1000 placed at the center of an image picked up is computed. At a step S1002, a check is made to find if the result of computation made at the step S1001 has exceeded a variable range (limit) of attitude of the camera. If not, the tracking object can be tracked with the camera 500 currently in use, and the flow proceeds to a step S1003. At the step S1003, a command is prepared for varying the attitude of the camera 500. The command is sent to the camera 500.

FIG. 16 shows the format of the command to be issued in this instance. In other words, a panning value, a tilting value and a magnification of zooming are written in on the basis of the geometric information computed at the step S1000. At a step S1004, the flow of operation waits for a predetermined period of time, which is a standby time provided for waiting until completion of an attitude varying process at the camera 500 after receipt of the attitude varying command. In the case of the fourth embodiment, this step is executed by means of the timer function of the computer terminal 600.

At the next step S1005, an enquiry is made for the focusing state of the camera 500. Then, a check is made to find if the camera 500 is in focus. If the camera 500 is found to be in focus, the flow proceeds to a step S1007 to store in the RAM 606 information on an in-focus distance obtained. The details of the manner in which an in-focus state is decided and the information on the in-focus distance is obtained are the same as what has already been described in the foregoing with respect to the first embodiment and are, therefore, omitted here.

If the result of computation made at the step S1001 is found at the step S1002 to have exceeded the attitude variable range, the flow proceeds from the step S1002 to a step S1008. At the step S1008, a message requesting an evaluation value is prepared in a manner as described in the foregoing with reference to FIG. 19, and the message is broadcasted. At a step S1009, a timer is reset (to "0") for waiting a period of time "t" (set to be suited for the system) for a response to the message. At a step S1010, a check is made to find if the time "t" has elapsed. If not, the flow proceeds to a step S1011 to make a check for any response message from the camera 500.

If a response message from any of the cameras 500 is found, the flow proceeds from the step S1011 to a step S1012. At the step S1012, a process for receiving the response message is executed. The response message is supposed to be received in the format as shown in FIG. 23, and the evaluation value included in the message is stored in the RAM 606 for each camera ID separately from other camera IDs. After that, the process of the step S1010 is repeated. If no response message is found to have been received at the step S1011, the flow returns to the step S1010.

If the period of time "t" is found at the step S1010 to have elapsed, the flow proceeds from the step S1010 to a step S1013. At the step S1013, a check is made to find if there is any camera that is useable for tracking in place of the current tracking camera. This search is made by making reference to the evaluation value of each camera stored in the RAM 606 at the step S1012. One of the cameras having the highest evaluation value among others is selected. Then, the evaluation value of the selected camera is examined to find if it is larger than a threshold value. If any camera is thus found to be usable in place of the current tracking camera, the flow proceeds to a step S1014 to carry out a camera change-over process. The flow them returns from the step S1014 to the step S1001.

If no camera is found at the step S1013 to be usable in place of the current tracking camera, the flow proceeds from the step S1013 to a step S1015. At the step S1015, the flow waits for a predetermined period of time. This standby time is provided because the tracking object might move to come into the attitude variable range of any of the cameras 500. The predetermined standby time varies with the environment under which the system is operating and also with the tracking object. Therefore, the standby time is arranged to be inputted by the user of the system through the input device 602. The standby time is stored in the RAM 606 by adding it to a standby time last used for waiting.

At a step S1016, a check is made to find if the sum of standby time has exceeded a predetermined period of time T. This step is provided for preventing the processes of steps S1008 to S1017 from being endlessly repeated. If the total standby time is found at the step S1016 to be not in excess of the predetermined time T, the flow proceeds to a step S1017. At the step S1017, a position of the object predicted to be obtained after the lapse of a predetermined time is predictively computed. For the step S1017, it is necessary to have information on the last position of the object stored and to compute a moving speed of the object from the moving amount of the object. However, the value of the moving speed of the object is computable by using information on an in-focus distance last obtained for the object and stored in the RAM 606. The details of the computing operation are the same as what has been described in the foregoing with respect to FIG. 17 and are, therefore, omitted from description here. After the step S1017, the flow comes to repeat the processes from the step S1008.

If the total standby time is found at the step S1016 to be in excess of the predetermined time, the flow proceeds from the step S1016 to a step S1018. At the step S1018, a message indicating that the object is no longer trackable is outputted and displayed on the display 601. At a step S1019, the tracking mode is turned off to forcibly terminate the tracking operation.

In the system according to the fourth embodiment of the invention, as described above, the computer terminal 600 broadcasts an evaluation requesting message to the cameras 500. Then, each of the message receiving cameras 500 computes an evaluation value from the position of the object and information on the setting state of itself and sends the computed evaluation value to the computer terminal 600 as a response message. Upon receipt of the response messages, the computer terminal 600 selects one of the cameras 500 by making reference to evaluation values included in the response messages received, so that the object tracking camera can be adequately changed from one camera over to another.

Figure 25:
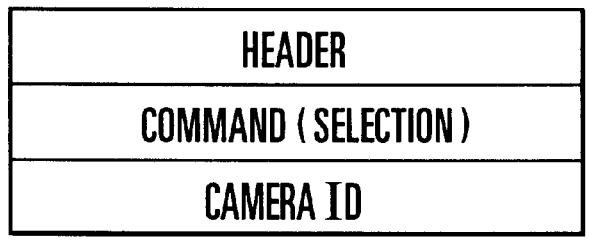
FIG. 25 is a diagram showing the format of a camera selection message to be sent to notify the camera of a start of control of the camera.
Figure 26:
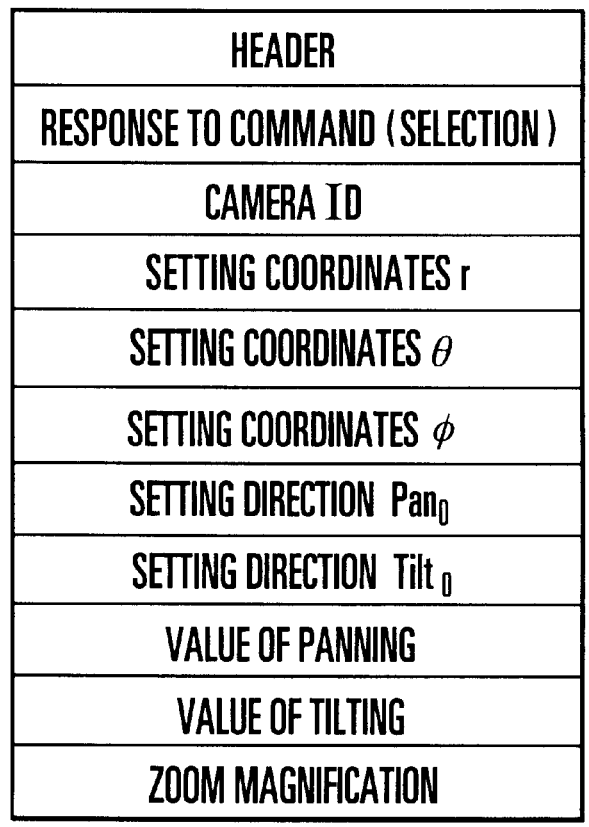
FIG. 26 is a diagram showing the format of a response message to be sent in response to the camera selection message.

In each of the third and fourth embodiments, the computer terminal 600 sends, at a start of camera control, a camera selecting message to the cameras 500. The camera selecting message is prepared as shown in FIG. 25 to inform the start of the camera control. Upon receipt of the camera selecting message, a response message which is prepared as shown in FIG. 26 is sent from each camera 500 to the computer terminal 600 in reply to the camera selecting message.

A storage medium which is arranged according to the invention is next described as another embodiment thereof.

Software program codes for carrying out the functions of each of the embodiments described above are stored in the storage medium. The storage medium is supplied to a system or an apparatus. The functions then can be carried out by reading the program codes out from the storage medium by means of a computer (or a CPU or an MPU) of the system or the apparatus.

In this case, since the functions of each of the embodiments described in the foregoing are carried out by the program codes read out from the storage medium, the storage medium can be considered to constitute an embodiment of the invention.

The storage medium to be used for supplying the program codes may be selected from among a group of media such as a semiconductor memory, an optical disk, a magneto-optical disk, a magnetic recording medium, etc., and may be arranged in the form of a ROM, a RAM, a CD-ROM, a floppy disk, a magnetic tape, a nonvolatile memory card or the like.

Further, not only the arrangement wherein the program codes read out are executed by a computer to carry out the functions of each embodiment disclosed, but also an arrangement wherein, in accordance with the program codes, a part of or all of actual processes are executed to carry out the functions of each of the embodiments by an OS (operating system) or the like operating at the computer is also considered to constitute an embodiment of the invention.

The functions of each embodiment disclosed also can be carried out in the following manner. The program codes read out from the storage medium are first written into an function extending board inserted in a computer or into a memory included in a function extending unit which is connected to the computer. After that, in accordance with the commands of the program codes, a part of or all of actual processes are executed to carry out the functions of each embodiment disclosed by means of a CPU or the like provided on the function extending board or the function extending unit.

In a case where the arrangement according to the invention is applied to a storage medium of the above-stated kind, a program codes corresponding to each of the flow charts described in the foregoing are stored in the storage medium. In brief, the storage medium according to the invention stores therein a module arranged to change the tracking camera selectively from one camera over to another among a plurality of cameras, a module arranged to output video images picked up, a module arranged to designate a desired tracking object, a module arranged to track the object designated, a module arranged to obtain information on the position of the tracking object within the video image, and a module arranged to compute values of the camera attitude control parameters on the basis of information on the focus adjustment of the camera and information on the position of the tracking object.

Each of the embodiments disclosed is capable of adequately performing control to enable the tracking camera to track the object without missing the object.

Each embodiment disclosed is arranged to be capable of adequately changing the tracking camera from one camera over to another in a case where the tracking object comes outside of a predetermined image range, so that the tracking object always can be displayed within the predetermined range of image on display.

Each embodiment disclosed can select a camera located in a position where the tracking object can be most easily tracked among the plurality of cameras on the basis of information on the states of setting of the cameras and geometric information on the cameras.

Further, in a case where the tracking object becomes no longer trackable with the cameras, a most easily trackable camera can be selected from among the cameras by predicting the moving position of the tracking object.

What is claimed is:

1. A camera control apparatus for controlling a plurality of cameras for tracking an object, said camera control apparatus comprising:

an obtaining device for obtaining, from the camera which is tracking the object (a) information on a position of the object within a picked-up image and (b) information on an object distance; and a control device for performing such control as to change the camera which tracks the object from a first camera to a second camera which contains adjustable focus, on the basis of (a) the information on the position of the object within the picked-up image and (b) the information on the object distance obtained by said obtaining device;

wherein, when said control device changes the camera which tracks the object from the first camera to the second camera and changes the attitude of the second camera, said obtaining device obtains the information on the object distance which is determined in accordance with the focus state adjusted for the changed attitude, from the second camera.

2. A camera control apparatus according to claim 1, further comprising collecting device for collecting information on attitudes of cameras respectively from the plurality of cameras, wherein said control device performs such control as to change the camera for tracking the object from said first camera to said second camera, on the basis of the information on attitudes of cameras collected by said collecting device.

3. A camera control apparatus according to claim 2, wherein, if the first camera which is currently tracking the object can not make the position of the object placed within a predetermined range of the picked-up image, said control device performs such control as to change the camera for tracking the object over to the second camera which can make the position of the object placed within the predetermined range of the picked-up image, on the basis of the information on attitudes of cameras collected by said collecting device.

4. A camera control apparatus according to claim 2, further comprising predicting means for predictively computing a movement destination of the object, and wherein said control means performs such control as to change the camera for tracking the object over to a camera which can pick up an image of the movement destination of the object predicted by said predicting means, on the basis of the information on attitudes of cameras collected by said collecting means.

5. A camera control apparatus according to claim 4, wherein said obtaining means further obtains information on a moving speed and moving direction of the object, and said predicting means predicts the movement destination of the object on the basis of all the information obtained by said obtaining means.

6. A camera control apparatus according to claim 4, wherein, if the camera which tracks the object has reached a limit of driving for tracking the object, said predicting means predicts a movement destination of the object to be obtained when the position of the object within a picked-up image reaches one end of the picked-up image.

7. A camera control apparatus according to claim 1, further comprising:

requesting means for making a request to the plurality of cameras for evaluation values which indicate whether the respective cameras can track the object; and collecting means for collecting from the plurality of cameras the evaluation values obtained by the respective cameras in response to the request, wherein said control means selects a camera which can track the object among the plurality of cameras on the basis of the evaluation values collected by said collecting means, and changes the camera for tracking the object over to the selected camera.

8. A camera control apparatus according to claim 7, wherein said control means selects a camera which can track the object among the plurality of cameras on the basis of the evaluation values collected within a predetermined period of time (t) by said collecting means, and changes the camera for tracking the object over to the selected camera.

9. A camera control apparatus according to claim 8, wherein each of the evaluation values is a value used for determining whether the camera which tracks the object can pick up an image of a movement destination of the object to be obtained after the predetermined period of time (t).

10. A camera control apparatus according to claim 8, wherein, if no camera which can track the object among the plurality of cameras is found, said control means waits a further predetermined period of time until any camera which can track the object among the plurality of cameras is found.

11. A camera control apparatus according to claim 1, wherein each of the plurality of cameras is provided with automatic focusing means for automatically adjusting focus, and the information on the object distance obtained by said obtaining means is obtained from focus adjustment information of said automatic focusing means.

12. A camera control method for controlling a plurality of cameras for tracking an object, said camera control method comprising:

an obtaining step of obtaining, from the camera which is tracking the object, (a) information on a position of the object within a picked-up image and (b) information on an object distance; and a control step of performing such control as to change the camera which tracks the object from a first camera to a second camera which contains adjustable focus, on the basis of (a) the information on the position of the object within the picked-up image and (b) the information on the object distance obtained by said obtaining step;

wherein, when said control step changes the camera which tracks the object from the first camera to the second camera and changes the attitude of the second camera, said obtaining step obtains the information on the object distance which is determined in accordance with the focus state adjusted for the changed attitude, from the second camera.

13. A camera control method according to claim 12, further comprising a collecting step for collecting information on attitudes of cameras respectively from the plurality of cameras, wherein said control step performs such control as to change the camera for tracking the object from said first camera to said second camera, on the basis of the information on attitudes of cameras collected by said collecting step.

14. A camera control method according to claim 13, wherein, if the first camera which is currently tracking the object can not make the position of the object placed within a predetermined range of the picked-up image, said control step performs such control as to change the camera for tracking the object over to the second camera which can make the position of the object placed within the predetermined range of the picked-up image, on the basis of the information on attitudes of cameras collected by said collecting step.

15. A camera control method according to claim 13, further comprising a predicting step of predictively computing a movement destination of the object, and wherein said control step performs such control as to change the camera for tracking the object over to a camera which can pick up an image of the movement destination of the object predicted by said predicting step, on the basis of the information on attitudes of cameras collected by said collecting step.

16. A camera control method according to claim 15, wherein said obtaining step further obtains information on a moving speed and moving direction of the object, and said predicting step predicts the movement destination of the object on the basis of all the information obtained by said obtaining step.

17. A camera control method according to claim 15, wherein, if the camera which tracks the object has reached a limit of driving for tracking the object, said predicting step predicts a movement destination of the object to be obtained when the position of the object within a picked-up image reaches one end of the picked-up image.

18. A camera control method according to claim 12, further comprising:
   a requesting step of making a request to the plurality of cameras for evaluation values which indicate whether the respective cameras can track the object; and
   a collecting step of collecting from the plurality of cameras the evaluation values obtained by the respective cameras in response to the request,
   wherein said control step selects a camera which can track the object among the plurality of cameras on the basis of the evaluation values collected by said collecting step, and changes the camera for tracking the object over to the selected camera.

19. A camera control method according to claim 18, wherein said control step selects a camera which can track the object among the plurality of cameras on the basis of the evaluation values collected within a predetermined period of time (t) by said collecting step, and changes the camera for tracking the object over to the selected camera.

20. A camera control method according to claim 19, wherein each of the evaluation values is a value used for determining whether the camera which tracks the object can pick up an image of a movement destination of the object to be obtained after the predetermined period of time (t).

21. A camera control method according to claim 19, wherein, if no camera which can track the object among the plurality of cameras is found, said control step waits a further predetermined period of time until any camera which can track the object among the plurality of cameras is found.

22. A camera control method according to claim 12, wherein each of the plurality of cameras is provided with automatic focusing means for automatically adjusting focus, and the information on the object distance obtained by said obtaining step is obtained from focus adjustment information of said automatic focusing means.

23. A storage medium which stores therein a program for executing a process for controlling a plurality of cameras for tracking an object, said process comprising:
   obtaining, from the camera which is tracking the object,
      (a) information on a position of the object within a picked-up image and
      (b) information on an object distance, and
   performing such control as to change the camera which tracks the object from a first camera to a second camera which contains adjustable focus on the basis of (a) the information on the position of the object within the picked-up image and (b) the information on the object distance;
   wherein, when said control process changes the camera which tracks the object from the first camera to the second camera and changes the attitude of the second camera, said obtaining process obtains the information on the object distance which is determined in accordance with the focus state adjusted for the changed attitude, from the second camera.

24. A storage medium according to claim 23, said process further comprises collecting information on attitudes of cameras respectively from the plurality of cameras, and performing such control as to change the camera for tracking the object from said first camera to said second camera, on the basis of the collected information on attitudes of cameras.

25. A storage medium according to claim 24, wherein said process further comprises, if the first camera which is currently tracking the object can not make the position of the object placed within a predetermined range of the picked-up image, performing such control as to change the camera for tracking the object over to the second camera which can make the position of the object placed within the predetermined range of the picked-up image, on the basis of the collected information on attitudes of cameras.

26. A storage medium according to claim 24, wherein said process further comprises predictively computing a movement destination of the object, and performing such control as to change the camera for tracking the object over to a camera which can pick up an image of the predicted movement destination of the object, on the basis of the collected information on attitudes of cameras.

27. A storage medium according to claim 26, wherein said process further comprises further obtaining information on a moving speed and moving direction of the object, and predicting the movement destination of the object on the basis of all the obtained information.

28. A storage medium according to claim 26, wherein said process further comprises, if the camera which tracks the object has reached a limit of driving for tracking the object, predicting a movement destination of the object to be obtained when the position of the object within a picked-up image reaches one end of the picked-up image.

29. A storage medium according to claim 23, wherein said process further comprises:
   making a request to the plurality of cameras for evaluation values which indicate whether the respective cameras can track the object;
   collecting from the plurality of cameras the evaluation values obtained by the respective cameras in response to the request;
   selecting a camera which can track the object among the plurality of cameras on the basis of the collected evaluation values; and
   changing the camera for tracking the object over to the selected camera.

30. A storage medium according to claim 29, wherein said process further comprises selecting a camera which can track the object among the plurality of cameras on the basis of the evaluation values collected within a predetermined period of time (t), and changing the camera for tracking the object over to the selected camera.

31. A storage medium according to claim 30, wherein each of the evaluation values is a value used for determining whether the camera which tracks the object can pick up an image of a movement destination of the object to be obtained after the predetermined period of time (t).

32. A storage medium according to claim 30, wherein said process further comprises, if no camera which can track the object among the plurality of cameras is found, waiting a further predetermined period of time until any camera which can track the object among the plurality of cameras is found.

33. A storage medium according to claim 23, wherein each of the plurality of cameras is provided with automatic focusing means for automatically adjusting focus, and the information on the object distance is obtained from focus adjustment information of said automatic focusing means.

* * * * *